United States Patent
Nakazawa

(10) Patent No.: US 6,980,902 B2
(45) Date of Patent: Dec. 27, 2005

(54) ESTIMATION OF INTAKE GAS TEMPERATURE IN INTERNAL COMBUSTION ENGINE

(75) Inventor: Takashi Nakazawa, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 87 days.

(21) Appl. No.: 10/974,879

(22) Filed: Oct. 28, 2004

(65) Prior Publication Data

US 2005/0096833 A1   May 5, 2005

(30) Foreign Application Priority Data

Oct. 29, 2003   (JP)   ............................. 2003-368851

(51) Int. Cl.⁷ ............................................. G06F 19/00
(52) U.S. Cl. .................. 701/102; 701/103; 123/508.14
(58) Field of Search ............................... 701/101, 102, 701/103, 104; 123/508.14, 508.21

(56) References Cited

U.S. PATENT DOCUMENTS

| | | | |
|---|---|---|---|
| 5,584,177 A * | 12/1996 | Oketani et al. ............ | 60/284 |
| 6,408,825 B1 * | 6/2002 | Enoki et al. ................ | 123/467 |
| 2004/0089061 A1 * | 5/2004 | Matsunaga et al. ........ | 73/118.1 |
| 2004/0117104 A1 * | 6/2004 | Muto et al. ................. | 701/108 |

FOREIGN PATENT DOCUMENTS

| | | |
|---|---|---|
| JP | 5-180057 A | 7/1993 |
| JP | 7-166981 A | 6/1995 |
| JP | 8-159995 A | 6/1996 |
| JP | 9-189256 A | 7/1997 |
| JP | 9-264200 A | 10/1997 |
| JP | 11-36917 A | 2/1999 |
| JP | 11-148419 A | 6/1999 |
| JP | 2002-276436 A | 9/2002 |

* cited by examiner

Primary Examiner—John T. Kwon
(74) Attorney, Agent, or Firm—Foley & Lardner LLP

(57) ABSTRACT

Air is aspirated into a combustion chamber (5) of an internal combustion engine (1) through an intake passage (3) and an intake valve (15). Purge gas and externally recirculated exhaust gas are mixed into the air in the intake passage (3) through a purge gas passage (64) and an exhaust gas recirculation passage (25). A controller (31) estimates temperature variation in the air inside the intake passage (3) from the inlet to the intake passage (3) to the point where the purge gas and externally recirculated exhaust gas are mixed into the air (S2, S3). The temperature of the gas that is aspirated into the combustion chamber (5) is estimated accurately on the basis of the mass, specific heat, and estimated temperature of the air, and the mass, specific heat, and temperature of the purge gas and externally recirculated exhaust gas that are mixed into the air (S4).

11 Claims, 17 Drawing Sheets

33 CRANK ANGLE SENSOR
34 CAM SENSOR
35 CAM SENSOR
43 TEMPERATURE SENSOR
44 ATMOSPHERIC PRESSURE SENSOR
45 PRESSURE SENSOR
46 EXHAUST GAS TEMPERATURE SENSOR
47 EXHAUST GAS PRESSURE SENSOR
48 PURGE GAS TEMPERATURE SENSOR
145 WATER TEMPERATURE SENSOR

ESTIMATION OF INTAKE GAS TEMPERATURE IN INTERNAL COMBUSTION ENGINE

FIELD OF THE INVENTION

This invention relates to estimation of the temperature of intake gas that is aspirated into a cylinder of an internal combustion engine.

BACKGROUND OF THE INVENTION

To perform optimal control of the fuel supply amount and ignition timing of an internal combustion engine, or to estimate generated torque accurately, the temperature of gas in the cylinder at the point in time when an intake valve closes or when the compression stroke begins must be determined accurately.

As a technique of estimating the temperature of intake gas in the cylinder, Tokkai Hei 09-189256, published by the Japan Patent Office in 1998, teaches a method in which an amount of residual heat is calculated by subtracting the amount of heat discharged from the engine room from the amount of heat generated in the internal combustion engine per unit time, and an amount of heat transmitted to the intake air aspirated into the cylinder is estimated on the basis of the amount of residual heat. The prior art also teaches a method in which an amount of heat transmitted to the intake system is estimated from the amount of accumulated heat in the engine main body, represented by the coolant temperature, and the temperature of the intake gas in the cylinder is estimated by correcting the outside air temperature on the basis of the amount of heat transmitted to the intake system.

Tokkai Hei 05-180057, published by the Japan Patent Office in 1993, teaches a method of estimating the intake gas temperature in a cylinder from the pressure in an intake pipe of the internal combustion engine, the amount of air passing through a throttle, and the volume of the intake pipe from the throttle to the intake valve, using an equation of state.

Tokkai Hei 11-148419, published by the Japan Patent Office in 1999, teaches a method in which the gas inside the engine is considered as a mixture of intake gas and residual gas, and the temperature of the gas in the cylinder is calculated from the temperature and mass of the intake gas and the temperature and mass of the residual gas using a predetermined computing expression.

SUMMARY OF THE INVENTION

The temperature of the intake air in the intake system of an engine and the air-fuel mixture in the cylinder is affected by the amount and physical properties of recirculated exhaust gas produced by exhaust gas recirculation (EGR gas) that is mixed into the intake air during the intake process, and evaporation gas produced by evaporated fuel in the fuel tank that converges with the intake air via an evaporated fuel purge system.

None of the aforementioned conventional techniques relating to intake gas temperature estimation takes sufficient account of such factors, and hence the precision with which the intake gas temperature is estimated can hardly be said to be high.

The degree of precision with which the intake gas temperature is estimated can be raised to a practical standard by correcting the conventional techniques using an experimental method known as matching. However, when the operating condition and operating environment of the internal combustion engine are subject to wide variation, matching requires a large number of steps. Moreover, even when matching is complete, if an engine component is exchanged for a component having a different specification, the effect of the new component on the estimated intake gas temperature is unknown, and hence matching must be performed again from the beginning.

It is therefore an object of this invention to realize an intake gas temperature estimating method according to which an intake gas temperature can be estimated precisely with few matching steps, even in an engine having a different specification.

In order to achieve the above object, this invention provides a programmable estimation device which estimates a temperature of an intake gas that is aspirated into a combustion chamber of an internal combustion engine. The device is programmed to estimate a mass, a temperature, and a specific heat of air that is aspirated into the combustion chamber, estimate a mass, a temperature, and a specific heat of a gas other than air that is aspirated into the combustion chamber, and estimate the temperature of the intake gas that is aspirated into the combustion chamber on the basis of the mass, temperature, and specific heat of the air and the mass, temperature, and specific heat of the gas other than air.

This invention also provides a programmable estimation method which estimates a temperature of an intake gas that is aspirated into a combustion chamber of an internal combustion engine. The method comprises estimating a mass, a temperature, and a specific heat of air that is aspirated into the combustion chamber, estimating a mass, a temperature, and a specific heat of a gas other than air that is aspirated into the combustion chamber, and estimating the temperature of the intake gas that is aspirated into the combustion chamber on the basis of the mass, temperature, and specific heat of the air and the mass, temperature, and specific heat of the gas other than air.

The details as well as other features and advantages of this invention are set forth in the remainder of the specification and are shown in the accompanying drawings.

FIELD OF THE INVENTION

Figure 1:
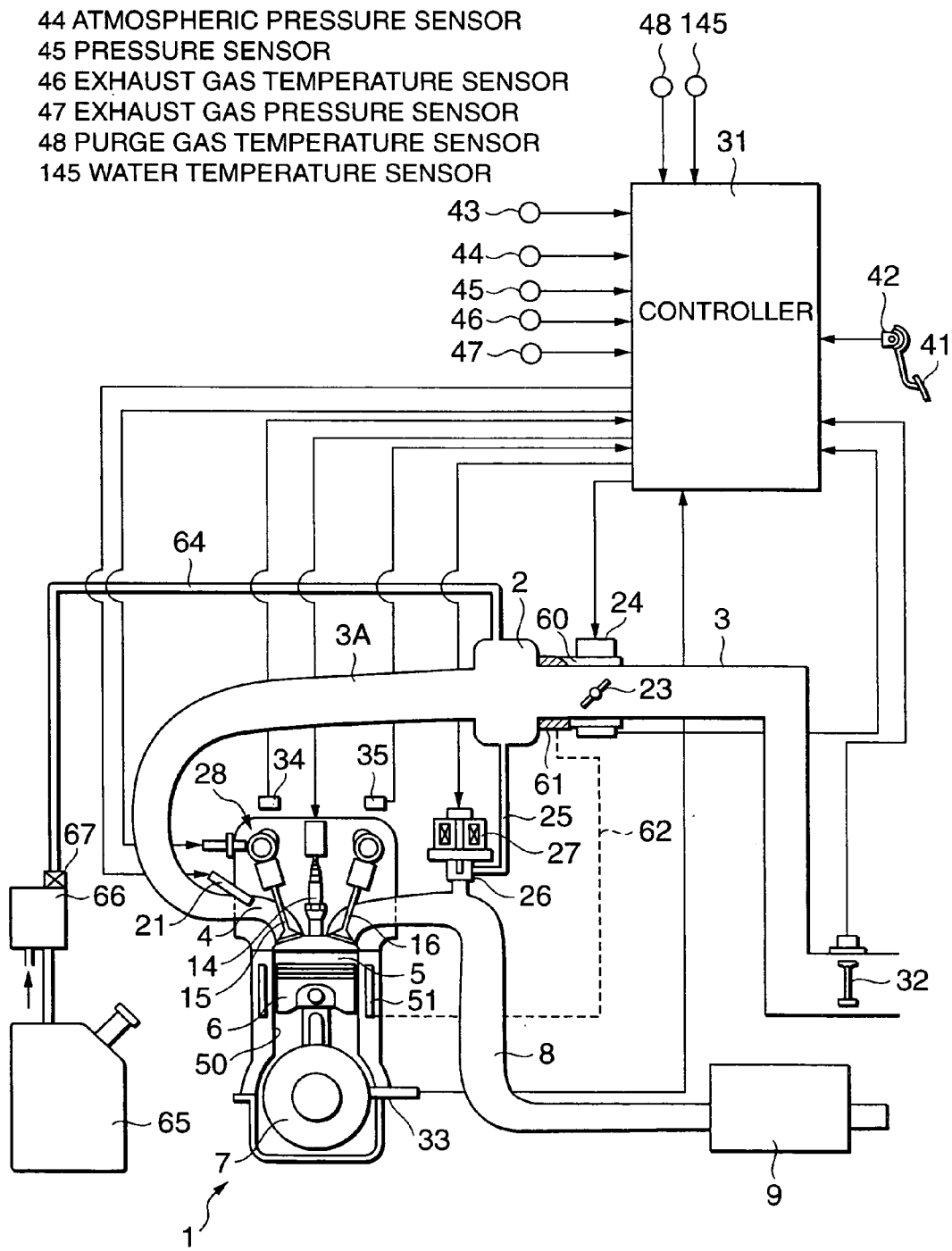
FIG. 1 is a schematic diagram of an internal combustion engine for an automobile to which this invention is applied.

Referring to FIG. 1 of the drawings, a four stroke-cycle internal combustion engine 1 is a multi-cylinder engine for an automobile provided with an L-jetronic type fuel injection device. The engine 1 compresses a gaseous mixture aspirated from an intake passage 3 into a combustion chamber 5 by a piston 6, and ignites the compressed gaseous mixture using a spark plug 14 to burn the gaseous mixture. The pressure of the combustion gas depresses the piston 6 so that a crankshaft 7 connected to the piston 6 rotates. The combustion gas is pushed out from the combustion chamber 5 by the piston 6 which is lifted due to the rotation of the crankshaft 7, and is discharged via an exhaust passage 8.

The piston 6 is housed in a cylinder 50 formed in a cylinder block. In the cylinder block, a water jacket through which a coolant flows is formed surrounding the cylinder 50.

An intake throttle 23 which adjusts the intake air amount and a collector 2 which distributes the intake air among the cylinders via an intake manifold 3A are provided in the intake passage 3. The intake throttle 23 is driven by a throttle motor 24. Intake air distributed by the collector 2 is aspirated into the combustion chamber 5 of each cylinder via an intake valve 15 from an intake port 4. The intake valve 15 functions under a Valve Timing Control (VTC) mechanism 28 which varies the opening/close timing. However, variation of the valve opening/close timing by the VTC mechanism 28 is so small that it does not affect the setting of a distribution ratio Xn described later.

Combustion gas in the combustion chamber 5 is discharged as exhaust gas to an exhaust passage 8 via an exhaust valve 16. The exhaust passage 8 is provided with a three-way catalytic converter 9. The three-way catalytic converter 9, by reducing nitrogen oxides (NOx) in the exhaust gas and oxidizing hydrocarbons (HC) and carbon monoxide (CO), removes toxic components in the exhaust gas. The three-way catalytic converter 9 has a desirable performance when the exhaust gas composition corresponds to the stoichiometric air-fuel ratio.

A fuel injector 21 which injects gasoline fuel into the intake air is installed in the intake port 4 of each cylinder.

A part of the exhaust gas discharged by the exhaust passage 8 is recirculated to the intake passage 3 via an exhaust gas recirculation (EGR) passage 25. The recirculation amount of the EGR passage 25 is adjusted by an exhaust gas recirculation (EGR) valve 26 driven by a diaphragm actuator 27.

Immediately after the intake valve 15 is opened, a part of the combustion gas remaining in the combustion chamber 5 of the engine 1 may flow back into the intake passage 3. Here, to differentiate between the exhaust gas that flows into the intake passage 3 along such a path and the exhaust gas that flows into the intake collector 2 from the EGR passage 25, the exhaust gas which flows into the intake passage 3 due to backflow will be referred to as internally recirculated exhaust gas, and the exhaust gas which flows into the intake collector 2 from the EGR passage 25 will be referred to externally recirculated exhaust gas.

To prevent freezing when the intake throttle 23 is cold, the engine 1 comprises a hot water heater 61 in a throttle chamber 60 which accommodates the intake throttle 23. Cooling water from the water jacket 51 is supplied to the hot water heater 61 through a hot water passage 62.

A purge gas passage 64 is connected to the intake collector 2. Evaporated fuel inside a fuel tank 65 is adsorbed to a canister 66 temporarily. When a purge valve 67 annexed to the canister 66 opens, atmospheric air entering the canister 66 causes the fuel to desorb from the canister 66. The desorbed fuel is aspirated with air into the intake collector 2 from the purge gas passage 64 in accordance with the intake negative pressure of the intake collector 2.

As described above, purge gas and EGR gas converge with intake air at various sites in the intake system, and thus influence the temperature of the intake air.

Figure 2:
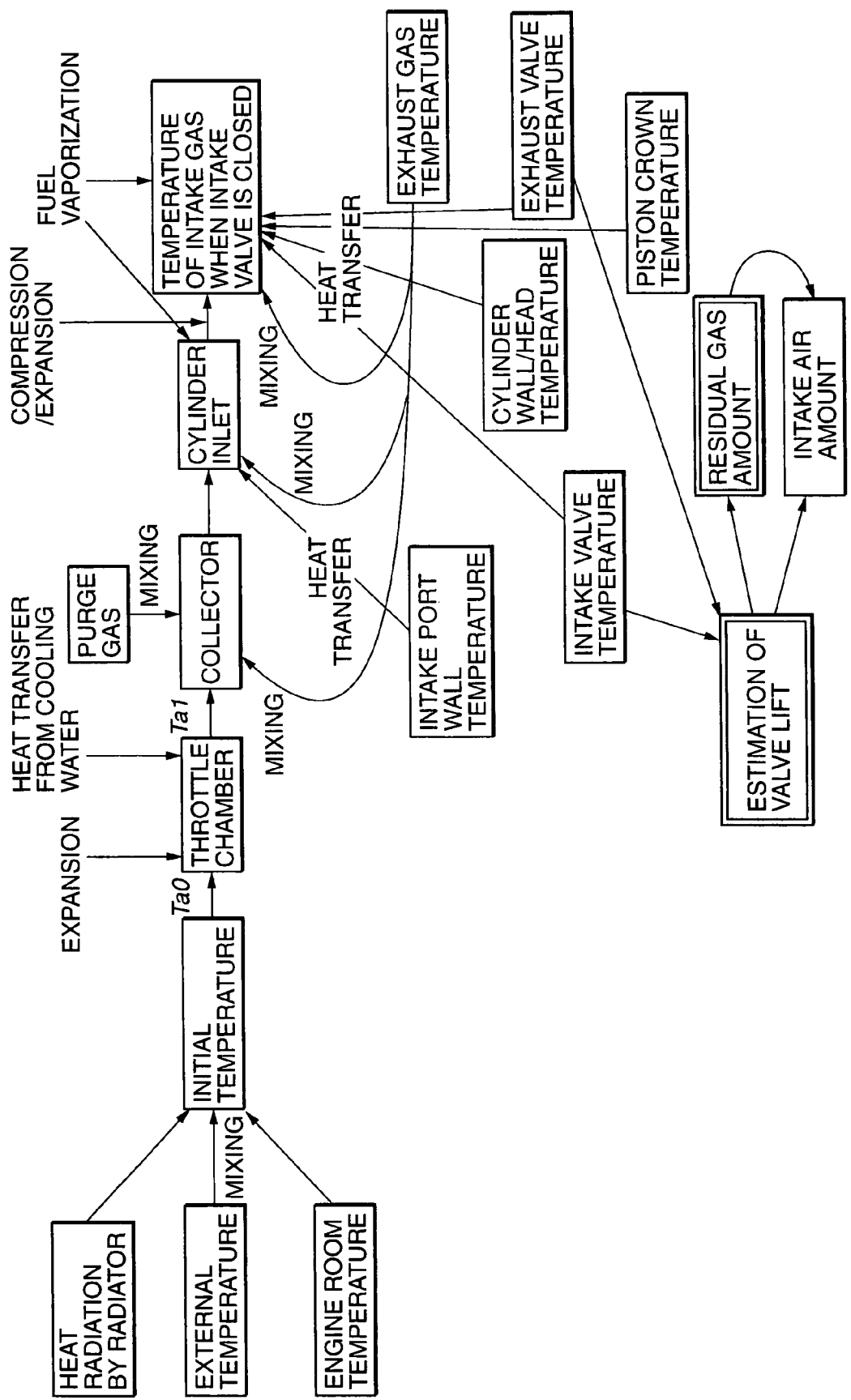
FIG. 2 is a block diagram expressing factors affecting the temperature of an air-fuel mixture in the engine throughout the intake process.

In order to estimate the temperature of the air-fuel mixture supplied to the combustion chamber 5 in consideration of this influence, the intake gas temperature estimation device according to this invention estimates the temperature of the intake gas using a model which takes account of temperature variation caused by heat transfer between the wall surfaces of the intake system and the intake air, temperature variation caused by the hot water heater 61, temperature variation caused by the vaporization of fuel suspended in the intake air, variation in the intake air negative pressure caused by sudden acceleration or deceleration, and temperature variation accompanying adiabatic expansion of the gas before and after the intake throttle, as shown in FIG. 2.

The intake air temperature in the vicinity of an air flow meter 32, for example, is applied as an initial temperature to be used as a reference when estimating the air-fuel mixture temperature since the vicinity of the air flow meter 32 is removed from the heat source, and hence there is no need to take internal and external heat transfer into account. Accordingly, a temperature sensor 43 is provided in the vicinity of the air flow meter 32. If no heat source exists, the location at which the initial temperature is detected may be placed closer to the vicinity of the intake port 4.

When the internal combustion engine 1 is for installation in a vehicle, the initial temperature may be estimated in consideration of such conditions as the atmosphere in the interior of the engine room, the outside air temperature, and heat emission from the radiator. However, the temperature distribution of air inside a vehicle engine room is complex and unstable, and it is therefore difficult to estimate the initial temperature accurately using such a method.

Next, the intake gas temperature estimating method according to this invention will be described in detail. Intake gas temperature estimation is executed by a controller 31.

The controller 31 is constituted by a microcomputer comprising a central processing unit (CPU), read-only memory (ROM), random access memory (RAM), and an input/output interface (I/O interface). The controller may be constituted by a plurality of microcomputers.

To estimate the intake gas temperature, an intake gas temperature device comprises the aforementioned temperature sensor 43 and the air flow meter 32, a pressure sensor 44 which detects an atmospheric pressure Pa0, a pressure sensor 45 which detects a pressure Pa1 of the intake collector 2, a cooling water temperature sensor 145 which detects a cooling water temperature Tw, a crank angle sensor 33 which detects an engine rotation speed Ne, a cam sensor 34 which detects the rotary angle of a cam which drives the intake valve 15, a cam sensor 35 which detects the rotary angle of a cam which drives the exhaust valve 16, an exhaust gas temperature sensor 46 which detects the exhaust gas temperature of the internal combustion engine 1, an exhaust gas pressure sensor 47 which detects the exhaust gas pressure, a purge gas temperature sensor 48 which detects the purge gas temperature, and an accelerator pedal depression sensor 42 which detects the depression amount of an accelerator pedal 41 provided in the vehicle. The detection data of these sensors are input into the controller 31 as signals.

1. Estimation of Intake Air Temperature Ta1 after Passing Through Throttle 23

The detected temperature of the temperature sensor 43 is set as an initial temperature Ta0. When the opening of the intake throttle 23 is large, the intake air temperature Ta1 after passing through the throttle is equal to the initial temperature Ta0. When the throttle opening is small, the intake air temperature decreases due to adiabatic expansion immediately after passing through the intake throttle 23. In this case, the intake air temperature Ta1 after passing through the throttle is calculated according to the following equation (1):

$$Ta1 = \left(\frac{P_{a0}}{P_{a1}}\right)^{\frac{\kappa-1}{\kappa}} \cdot Ta0 \qquad (1)$$

(1)

where

Pa0=atmospheric pressure,

Pa1=pressure of the intake collector 2, and k=specific heat ratio of air=1.4.

The detected pressure of the pressure sensor 44 is applied to the atmospheric pressure Pa0, and the detected pressure of the pressure sensor 45 is applied to the pressure Pa1 of the intake collector 2. These pressure values may also be estimated.

2. Estimation of Intake Air Temperature Ta2 after Passing Through Hot Water Heater 61

The intake air temperature Ta2 after passing through the hot water heater 61 is calculated according to the following equation (2):

$$Ta2 = Ta1 + (Tw - Ta1) \cdot Ne \cdot K \qquad (2)$$

where

Tw=cooling water temperature of the engine 1

Ta1=intake air temperature after passing through throttle

Ne=engine rotation speed, and

K=a constant determined by the heat capacity and heat transfer coefficient of the cooling water.

The detected temperature of the cooling water temperature sensor 145 is applied to the cooling water temperature Tw, and the engine rotation speed detected by the crank angle sensor 33 is applied to the engine rotation speed Ne. In Equation (2), the cooling water temperature Tw is used as a representative value of the wall surface temperature of the throttle chamber 60. The engine rotation speed Ne is used as a representative value of the intake air flow velocity and the flow velocity of the cooling water that is supplied to the hot water heater 61.

3. Estimation of Intake Air Temperature Ta3 after the Introduction of Various Gases from Outside As mentioned above, in the internal combustion engine 1, purge gas from the purge gas passage 64, externally recirculated exhaust gas from the EGR passage 25, and internally recirculated exhaust gas which back-flows from the intake valve 15 flow into the intake air after the intake air passes through the hot water heater 61. The gas that is produced when these gases are introduced will be referred to as intake gas.

3.1 Estimation of Internally Recirculated Exhaust Gas Temperature Tevc

First, the controller 31 reads a combustion chamber temperature Tevc0 at the close timing of the exhaust valve 16, which is determined from the temperature detected by the exhaust gas temperature sensor 46 at the close timing of the exhaust valve 16.

The combustion chamber temperature Tevc0 at the close timing of the valve 16 is dependent on the amount of heat generated in the internal ion engine 1. The generated heat amount of the internal combustion 1 corresponds to the difference between the fuel injection amount and the workload generated by combustion of the injected fuel. Hence it is possible to plot the combustion chamber temperature Tevc0 at the close timing of the exhaust valve 16 in advance on a map with the fuel injection amount as a parameter. In this case, the controller 31 refers to the map to determine the combustion chamber temperature Tevc0 from the fuel injection amount.

The controller 31 reads the exhaust gas pressure detected at the close timing of the exhaust valve 16 as a combustion chamber pressure Pevc at the close timing of the exhaust valve 16. The pressure detected by the exhaust gas pressure sensor 47 is used as the exhaust gas pressure.

The combustion chamber pressure Pevc at the close timing of the exhaust valve 16 is determined according to the air-fuel mixture volume and the pipe resistance of the exhaust system, and hence the combustion chamber pressure Pevc at the close timing of the exhaust valve 16 may be plotted in advance on a map with the volumetric flow of the air-fuel mixture as a parameter. In this case, the controller 31 refers to the map to determine the combustion chamber pressure Pevc at the close timing of the exhaust valve 16 from the volumetric flow of the air-fuel mixture.

Next, the controller 31 calculates an exhaust gas pressure Peivc at the open timing of the intake valve 15. The exhaust gas pressure Peivc at the open timing of the intake valve 15 corresponds to the pressure of the exhaust gas that is discharged immediately before the intake gas aspirated into the combustion chamber 5 from the intake valve 15 mixes with combustion gas, and is determined according to the following methods (a) and (b).

(a) When the open timing of the intake valve 15 is earlier than the close timing of the exhaust valve 16, or in other words when a valve overlap period exists, Peivc/Pevc=1.0.

(b) When the open timing of the intake valve 15 is later than the close timing of the exhaust valve 16, or in other words when no valve overlap period exists, Peivc/Pevc is read from a map of Peivc/Pevc determined in advance with the valve timing as a parameter.

The map of Peivc/Pevc used when no valve overlap period exists is set according to the relationship between the close timing of the exhaust valve 16, the open timing of the intake valve 15, and exhaust top dead center, and has the following characteristics.

When the close timing of the exhaust valve 16 is positioned before exhaust top dead center, the gas inside the combustion chamber 5 is subjected to adiabatic compression in the interval from the close timing of the exhaust valve 16 to exhaust top dead center. In the interval from exhaust top dead center to the open timing of the intake valve 15, the gas inside the combustion chamber 5 is subjected to adiabatic expansion. If the adiabatic compression period is longer than the adiabatic expansion period, Peivc/Pevc>1.0, and if the adiabatic compression period is shorter than the adiabatic expansion period, Peivc/Pevc<1.0. When the close timing of the exhaust valve 16 is positioned after top dead center, for example, there is no adiabatic compression period and only an adiabatic expansion period, and hence Peivc/Pevc<1.0.

Figure 3:
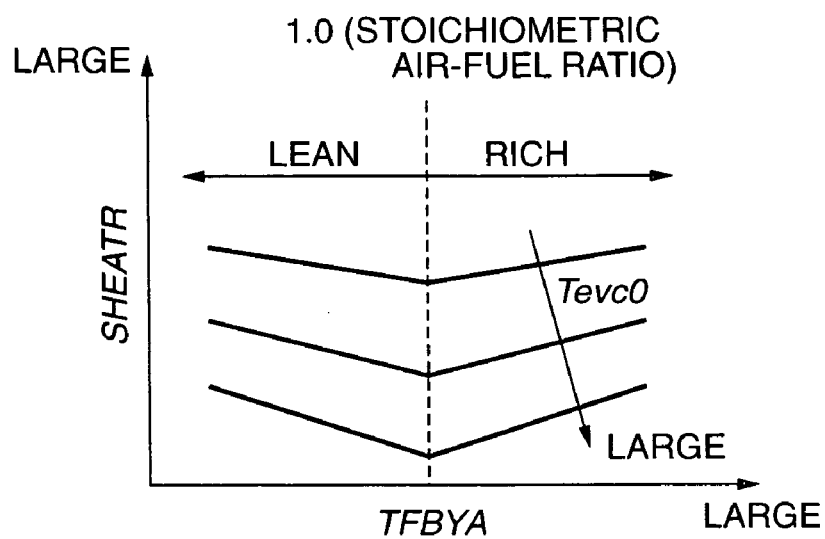
FIG. 3 is a diagram illustrating the characteristic of a map, which is stored in a controller according to this invention, for determining a ratio of specific heat of exhaust gas from a target equivalence ratio TFBYA and an exhaust gas temperature Tevc.

Next, the controller 31 calculates a combustion gas specific heat ratio SHEATR from a target equivalence ratio TFBYA of the combustion air-fuel mixture by looking up a map having the characteristics shown in FIG. 3. Referring to FIG. 3, the specific heat ratio SHEATR is smallest when the target equivalence ratio TFBYA is equal to 1.0, corresponding to the stoichiometric air-fuel ratio, and increases as the target equivalence ratio TFBYA moves away from 1.0. The target equivalence ratio TFBYA is a value obtained by dividing the stoichiometric air-fuel ratio (=14.7) by a target air-fuel ratio. The target equivalence ratio TFBYA is 1.0 when the target air-fuel ratio is equal to the stoichiometric air-fuel ratio. When the target air-fuel ratio is lean, the target equivalence ratio TFBYA is a positive value below 1.0, and when the target air-fuel ratio is rich, the target equivalence ratio TFBYA is a value exceeding 1.0.

When the target equivalence ratio TFBYA is constant, the specific heat ratio SHEATR decreases as the combustion chamber temperature Tevc0 at the close timing of the exhaust valve 16 rises.

The controller 31 uses the combustion chamber temperature Tevc0 at the close timing of the exhaust valve 16, Peivc/Pevc, and the combustion gas specific heat ratio SHEATR, determined as described above, to calculate a temperature Tevc of the internally recirculated exhaust gas using the following equation (3):

$$Tevc = \left(\frac{Peivc}{Pevc}\right)^{\frac{SHEATR-1}{SHEATR}} \cdot Tevc0 \quad (3)$$

3.2 Estimation of Externally Recirculated Exhaust Gas Temperature

The controller 31 reads the exhaust gas temperature detected by the exhaust gas temperature sensor 46 as an exhaust gas temperature Tegr0 upstream of the EGR valve 26. Further, the controller 31 reads the exhaust gas pressure detected by the exhaust gas pressure sensor 47 as an EGR gas pressure Pegr0 upstream of the EGR valve 26, and reads the pressure of the intake collector 2, detected by the pressure sensor 45, as an EGR gas pressure Pm downstream of the EGR valve 26.

Next, the controller 31 determines an EGR gas specific heat ratio SHEATR1 from the target equivalence ratio TFBYA and the exhaust gas temperature Tegr0 upstream of the EGR valve 26 by referring to a map having a similar characteristic to the map shown in FIG. 3. The EGR gas specific heat ratio SHEATR1 has a similar characteristic to the combustion gas specific heat ratio SHEATR used to estimate the internally recirculated exhaust gas temperature Tevc, but whereas the combustion gas specific heat ratio SHEATR is dependent on the combustion chamber temperature Tevc0 at the close timing of the exhaust valve 16, the EGR gas specific heat ratio SHEATR1 is dependent on the exhaust gas temperature Tegr0 upstream of the EGR valve 26.

The controller 31 uses the EGR gas pressure Pegr0 upstream of the EGR valve 26, the EGR gas pressure Pm downstream of the EGR valve 26, the exhaust gas temperature Tegr0 upstream of the EGR valve 26, and the EGR gas specific heat ratio SHEATR1, determined as described above, to calculate the externally recirculated exhaust gas temperature Tegr using the following equation (4):

$$Tegr = \left(\frac{Pm}{Pegr0}\right)^{\frac{SHEATR1-1}{SHEATR1}} \cdot Tegr0 \quad (4)$$

In this embodiment, an EGR system which recirculates EGR gas to the intake collector 2 is used, but the temperature of the externally recirculated exhaust gas may be calculated using a similar method in an EGR system which recirculates EGR gas to the intake port 4.

3.3 Temperature Variation Caused by the Introduction of External Gases

The controller 31 calculates an intake gas temperature Ta3 after purge gas from the canister 66, internally recirculated exhaust gas, and externally recirculated exhaust gas are introduced respectively into the intake air according to the following equation (5):

$$Ta3 = \frac{Ca \cdot Ma \cdot Ta2 + Cegr \cdot Megr \cdot Tegr + Cevp \cdot Mevp + Cres \cdot Mres \cdot Tevc}{Ca \cdot Ma + Cegr \cdot Megr + Cevp \cdot Mevp + Cres \cdot Mres} \quad (5)$$

where
Ca=specific heat of air,
Ma=intake air amount,

Cegr=specific heat of the externally recirculated exhaust gas,

Megr=amount of externally recirculated exhaust gas,

Cevp=specific heat of the purge gas,

Mevp=purge gas amount,

Tevp=purge gas temperature,

Cres=specific heat of the internally recirculated exhaust gas, and

Mres=amount of internally recirculated exhaust gas.

The specific heat Cegr of the externally recirculated exhaust gas can be calculated from the target equivalence ratio TFBYA and the externally recirculated exhaust gas temperature Tegr. The specific heat Cegr of the externally recirculated exhaust gas can be considered equal to the specific heat of the exhaust gas. Hence, the specific heat Cegr of the externally recirculated exhaust gas is calculated using a method disclosed in Tokkai Hei 8-159995, published by the Japan Patent Office in 1996, for determining the specific heat at constant pressure of exhaust gas. The specific heat Cegr of the externally recirculated exhaust gas may also be determined through experiment.

The externally recirculated exhaust gas amount Megr may be calculated using a well-known flow rate formula having as parameters the opening area of the EGR valve, which is determined according to the opening of the EGR valve 26, and the differential pressure between the EGR gas pressure Pegr0 upstream of the EGR valve 26 and the EGR gas pressure Pm downstream of the EGR valve 26. More specifically, the calculation method disclosed in Tokkai Hei 9-264200, published by the Japan Patent Office in 1997, may be applied.

The temperature detected by the purge gas temperature sensor 48 is applied to the purge gas temperature Tevp.

The purge gas amount Mevp is calculated using a formula having as parameters the opening area of the purge valve 67 and the differential pressure between the atmospheric pressure Pa0 and the pressure Pa1 of the intake collector 2. The pressure detected by the pressure sensor 45 may be used as the pressure Pa1 of the intake collector 2, and the pressure detected by the pressure sensor 44 may be used as the atmospheric pressure Pa0. More specifically, the calculation method disclosed in Tokkai Hei 7-166981, published by the Japan Patent Office in 1994, may be applied.

The specific heat Cevp of the purge gas may be calculated from the specific gasoline heat and specific air heat, which are known values, on the basis of the ratio between the purge gas amount Mevp and the desorption amount of evaporated gas from the canister 66, or in other words the fuel concentration of the purge gas. A method of calculating the fuel concentration of the purge gas is disclosed in Tokkai Hei 11-36917, published by the Japan Patent Office in 1999. A method of calculating the desorption amount of evaporated fuel from the canister 66 is disclosed in JP2002-276436A, published by the Japan Patent Office in 2002.

The specific heat Cres of the internally recirculated exhaust gas may be considered substantially equal to the specific heat Cegr of the externally recirculated exhaust gas.

The internally recirculated exhaust gas amount Mres is calculated according to the following equation (6):

$$Mres = Mrescyl + Mreso \qquad (6)$$

where

Mrescyl=amount of residual gas in the combustion chamber 5 at the close timing of the exhaust valve 16, and Mresol=amount of combustion gas backflow from the combustion chamber 5 into the intake passage 3 accompanying the opening of the intake valve 15.

The residual gas amount Mrescyl in Equation (6) is calculated according to the following equation (7):

$$Mrescyl = \frac{Pevc \cdot Vevc}{Rex \cdot Tevc} \qquad (7)$$

where

Rex=gas constant of the combustion gas determined according to the target equivalence ratio TFBYA, Vevc=space volume of the combustion chamber 5 at the close timing of the exhaust valve 16, Tevc=temperature of the internal EGR gas, and Pevc=pressure of the residual gas in the combustion chamber 5 at the close timing of the exhaust valve 16.

Figure 19:
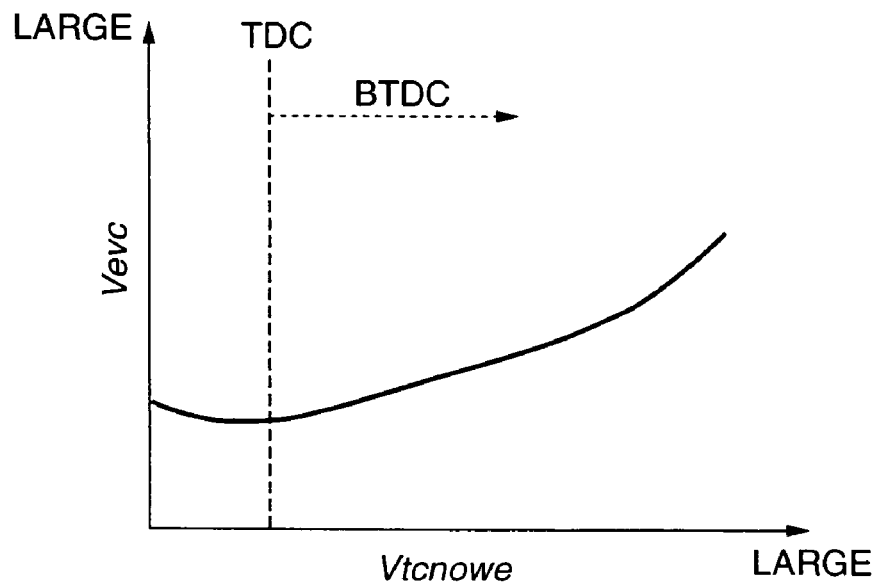
FIG. 19 is a diagram illustrating the characteristic of a map, which is stored in the controller, of a space volume Vevc of the combustion chamber at a close timing of an exhaust valve.

The space volume Vevc of the combustion chamber 5 at the close timing of the exhaust valve 16 may be determined on the basis of the close timing of the exhaust valve 16 by looking up a map having the characteristics shown in FIG. 19. Referring to FIG. 19, a variation amount Vtcnowe in the exhaust valve open/close timing, which is dependent on the VTC mechanism 28, is determined from the rotary angle of the cam detected by the cam sensor 35.

Figure 20:
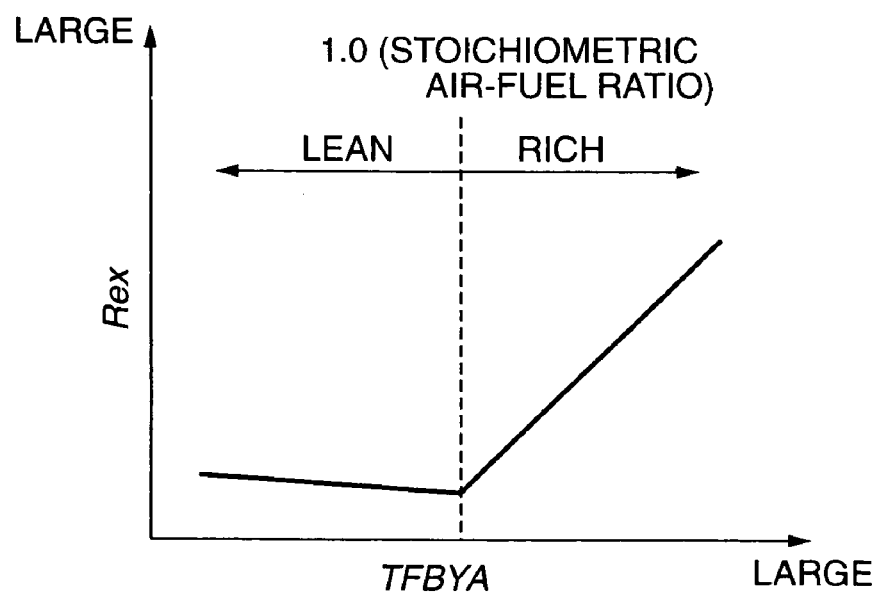
FIG. 20 is a diagram illustrating the characteristic of a map, which is stored in the controller, of a gas constant Rex of combustion gas.

The gas constant Rex of the combustion gas may be determined on the basis of the equivalence ratio TFBYA by looking up a map having the characteristics shown in FIG. 20. The broken line in the diagram shows a value of the target equivalence ratio TFBYA corresponding to the stoichiometric air-fuel ratio.

Values used in the item 3.1 above are used for the internal EGR gas temperature Tevc0 and the residual gas pressure Pevc in the combustion chamber 5 at the close timing of the exhaust valve 16.

Next, calculation of the backflow amount Mresol of the combustion gas from the combustion chamber 5 into the intake passage 3 will be described.

A valve overlap amount Vtcol between the intake valve 15 and exhaust valve 16 is calculated according to the following equation (8):

$$Vtcol = Vtcnow + Vtcnoe \qquad (8)$$

where

Vtcnow=variation in the open/close timing of the intake valve 15, determined from a signal from the cam sensor 34, and Vtcnowe=variation in the open/close timing of the exhaust valve 16, determined from a signal from the cam sensor 35.

Figure 21:
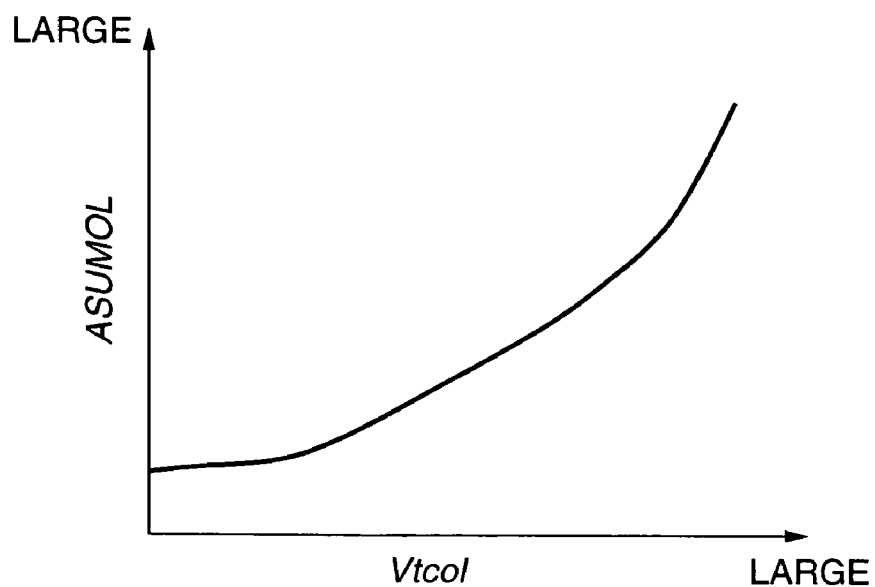
FIG. 21 is a diagram illustrating the characteristic of a map, which is stored in the controller, of a cumulative effective area ASUMOL.
Figure 22:
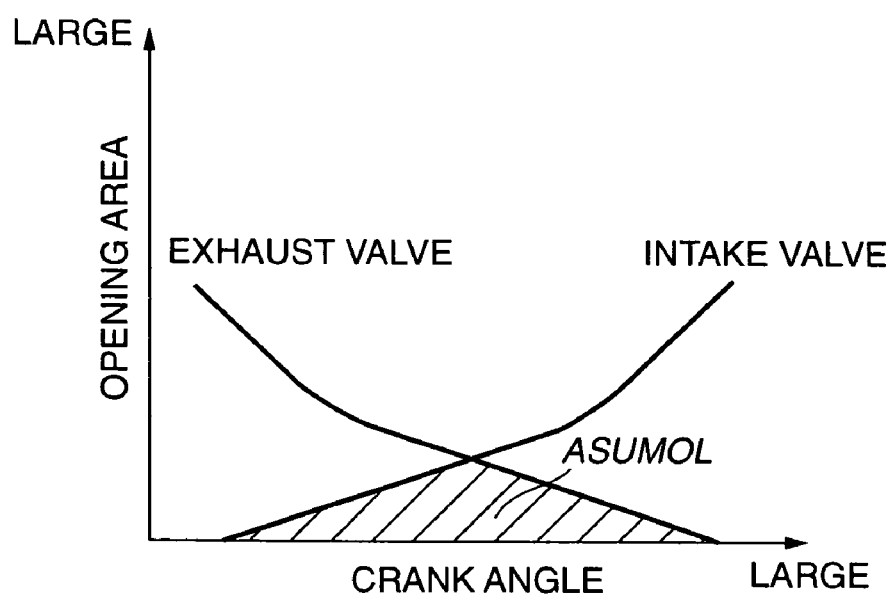
FIG. 22 is a diagram illustrating the cumulative effective area ASUMOL.

Next, referring to a map having the characteristics shown in FIG. 21, the cumulative effective area ASUMOL during the overlap period is determined from the valve overlap amount Vtcol. As shown in FIG. 22, the smaller of the opening area of the exhaust valve 16 and the opening area of the intake valve 15 during the overlap period is considered to be the effective area, and the integrated effective area throughout the overlap period is the cumulative effective area ASUMOL. The cumulative effective area ASUMOL is shown by the shaded area of the diagram.

Overlap between the intake valve 15 and exhaust valve 16 can be considered as the formation of a quasi-orifice. Hence, the backflow amount Mresol of combustion gas from the combustion chamber 5 into the intake passage 3 which accompanies the opening of the intake valve 15 is calculated using the cumulative effective area ASUMOL according to the following equation (9):

$$Mresol = \frac{Mresoltmp \cdot Asumol \cdot 60}{Ne \cdot 360} \qquad (9)$$

where

Mresoltmp=flow rate of the backflow of combustion gas from the combustion chamber 5 into the intake passage 3 accompanying the opening of the intake valve 15.

The backflow flow rate Mresoltmp is determined in the following manner.

First, a gas flow rate equation density item Mrsold is calculated from the combustion gas constant Rex and the internal EGR gas temperature Tevc according to the following equation (10):

$$Mrsold = SQRT\left(\frac{1}{Rex \cdot Tevc}\right) \qquad (10)$$

where

SQRT=a coefficient relating to the temperature and gas constant.

To perform the calculation in Equation (10), the results of the calculation using the gas constant Rex and internal EGR gas temperature Tevc may be stored in the controller 31 in advance as a map, whereupon the gas flow rate equation density item Mrsold may be determined from the gas constant Rex and internal EGR gas temperature Tevc by referring to the map.

Next, an intake/exhaust pressure ratio PINBYEX is calculated from the pressure Pa1 of the intake collector 2 and the combustion chamber pressure Pevc at the close timing of the exhaust valve 16 according to the following equation (11):

$$PINBYEX = \frac{Pa1}{Pavc} \qquad (11)$$

Next, a gas flow rate equation differential pressure item Mrsolp is calculated from the combustion gas specific heat ratio SHEATR calculated in the previous item 3.1 and the intake/exhaust pressure ratio PINBYEX according to the following equation (12):

$$Mrsolp = \qquad (12)$$
$$SQRT\left\{\frac{SHEATR}{SHEATR-1} \cdot \left(PINBYEX^{\frac{2}{SHEATR}} - PINBYEX^{\frac{SHEATR-1}{SHEATR}}\right)\right\}$$

The backflow flow rate Mresoltmp is determined from the above calculation results by the following equation (13):

$$Mresol=1.4 PEVC \cdot Mrsold \cdot Mrsop \qquad (13)$$

By substituting the obtained backflow flow rate Mresoltmp into Equation (9), the backflow amount Mresol of combustion gas from the combustion chamber 5 into the intake passage 3 accompanying the opening of the intake valve 15 is calculated, and by substituting the backflow flow rate Mresol into Equation (6), the internally recirculated exhaust gas amount Mres is calculated.

Figure 4:
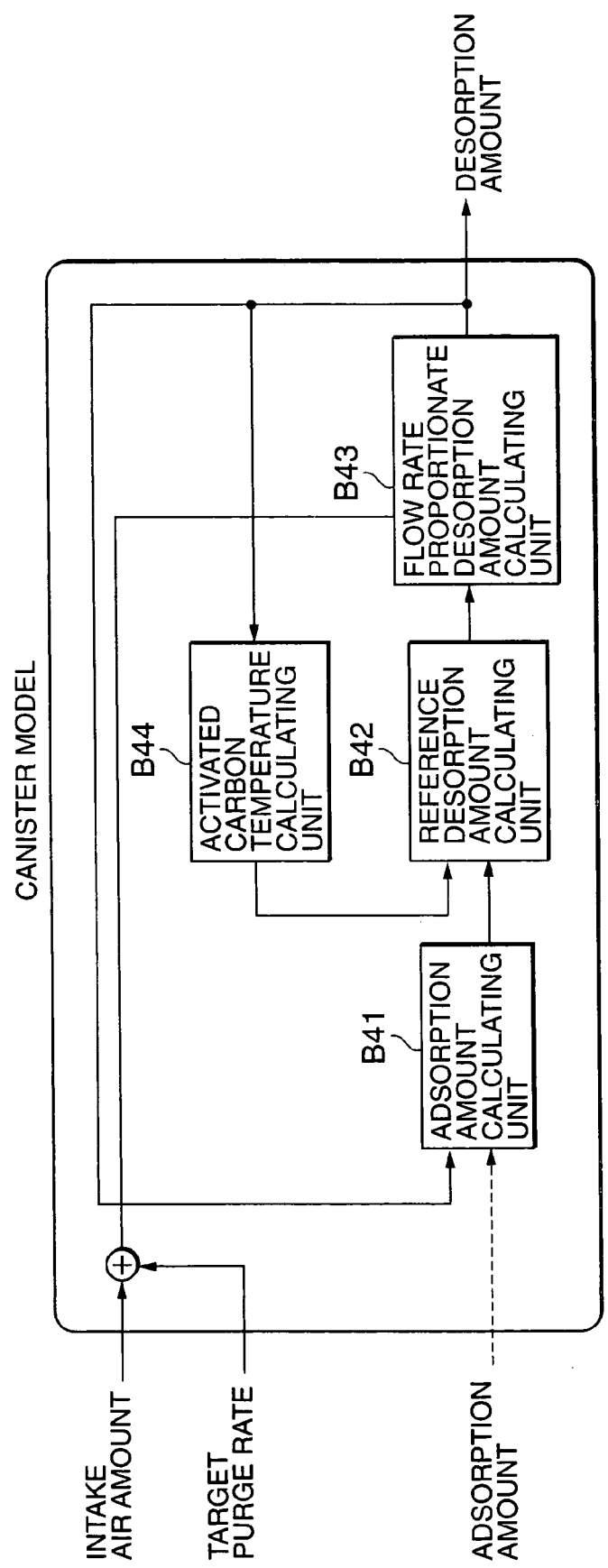
FIG. 4 is a block diagram illustrating a function provided in the controller for estimating an amount of evaporated fuel desorption from a canister.

Referring to FIG. 4, the controller 31 which performs these calculations comprises an adsorption amount calculating unit B41, a reference desorption amount calculating unit B42, a flow rate-proportionate desorption amount calculating unit B43, and an activated carbon temperature calculating unit B44. These units B41–B44 represent the functions of the controller 31 as virtual units, and do not exist physically. The controller 31 calculates the evaporated fuel desorption amount repeatedly at fixed time intervals using these units.

The adsorption amount calculating unit B41 calculates the current adsorption amount from the previous adsorption amount value and previous desorption amount value of the evaporated fuel. The reference desorption amount calculating unit B42 calculates the evaporated fuel desorption amount at a reference purge flow using the temperature of activated carbon stored in the canister 66, calculated by the activated carbon temperature calculating unit B44, the evaporated fuel adsorption amount, calculated by the adsorption amount calculating unit B41, a predetermined desorption constant, and a predetermined desorption index. The flow rate-proportionate desorption amount calculating unit B43 calculates the product of the purge flow and the evaporated fuel desorption amount at the reference purge flow, calculated by the adsorption amount calculating unit B41, and calculates the evaporated fuel desorption amount from the canister 66 corresponding to the purge flow. The purge flow is the product of the purging rate and the engine intake air amount.

According to this method, the evaporated fuel desorption amount at the reference purge flow is calculated with the activated carbon temperature as a parameter, and hence the evaporated fuel desorption amount from the canister 66 can be calculated accurately in accordance with the activated carbon temperature.

4. Estimation of Intake Gas Temperature Ta4 During Transmission Through Intake Valve 15

Next, the controller 31 calculates an intake gas temperature Ta4 as the intake gas passes through the intake valve 15.

First, the controller 31 calculates an intake gas temperature Ta41 after passing through the intake port 4 using the following equation (14):

$$Ta41=Ta3+(Tw-Ta3)\cdot Ne \cdot K \qquad (14)$$

where

Tw=cooling water temperature of the internal combustion engine 1, detected by the cooling water temperature sensor 145, Ne=engine rotation speed, serving as a representative value of the intake gas flow velocity or the cooling water flow velocity, and K=a constant determined by the heat capacity and heat transfer coefficient of the cooling water.

Next, the controller 31 calculates an intake gas temperature Ta42 produced by adiabatic compression during rapid acceleration or adiabatic expansion during rapid deceleration according to the following equation (15):

$$Ta42 = \left(\frac{Pc}{Pm}\right)^{\frac{MIXAIRSHR-1}{MIXAIRSHR}} \cdot Ta41 \qquad (15)$$

where

Pm=pressure inside the intake manifold 3A,
Pc=pressure in the combustion chamber 5, and
MIXAIRSHR=specific heat ratio of the intake gas.

Under operating conditions of the engine 1 other than rapid acceleration or rapid deceleration, Pc=Pm. According to an experiment carried out by the inventor, Pc<Pm over approximately one operating cycle during rapid acceleration. During rapid deceleration, Pc>Pm over approximately one operating cycle. Rapid acceleration and rapid deceleration can be determined according to signals from the accelerator pedal depression sensor 42.

Figure 5:
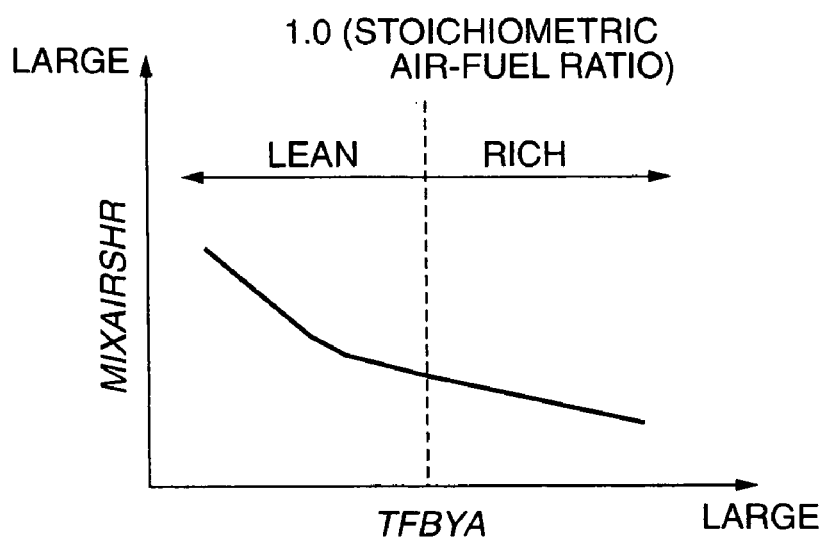
FIG. 5 is a diagram illustrating the characteristic of a map stored in the controller for determining a ratio of specific heat of the air-fuel mixture from the target equivalence ratio.

Referring to FIG. 5, the controller 31 determines the intake gas specific heat ratio MIXAIRSHR on the basis of the target equivalence ratio TFBYA by looking up a map having the characteristics shown in the diagram. The broken line in the diagram indicates the target equivalence ratio TFBYA corresponding to the stoichiometric air-fuel ratio. The intake gas specific heat ratio MIXAIRSHR increases as the target equivalence ratio TFBYA becomes leaner than the stoichiometric air-fuel ratio, and decreases as the target equivalence ratio TFBYA becomes richer.

Next, the controller 31 calculates an intake air temperature Ta43 when the intake gas causes choking in the intake valve 15. In the internal combustion engine 1 comprising the VTC mechanism 28, when the valve lift is small, the intake valve 15 chokes, resulting in variation in the intake gas temperature.

The controller 31 calculates the intake gas temperature Ta43 under the influence of choking according to the following equation (16):

$$Ta43 = \left(\frac{Pc}{Pport}\right)^{\frac{MIXAIRSHR-1}{MIXAIRSHR}} \cdot Ta42 \qquad (16)$$

where
Pc=pressure of the combustion chamber 5,
Pport=pressure of the intake port 4, and
MIXAIRSHR=specific heat ratio of the intake gas.

The pressure Pm inside the intake manifold 3A is applied to the pressure Pport of the intake port 4. The controller 31 uses the intake gas temperature Ta43 obtained in Equation (16) as the intake gas temperature Ta4 while passing through the intake valve 15.

5. Estimation of Air-Fuel Mixture Temperature Tivc in Combustion Chamber 5 at Close Timing of Intake Valve 15

Estimation of Temperature Ta5 Considering Latent Heat of Fuel Vaporization

The controller 31 estimates the temperature of the combustion chamber 5 at the close timing of the intake valve 15.

First, the fuel injected by the fuel injector 21 is vaporized in the intake port 4 and combustion chamber 5, and then the temperature Ta5 of the air-fuel mixture inside the combustion chamber 5 when the intake gas is affected by vaporization latent heat is calculated. Here, the mixture of intake gas and injected fuel is referred to as an air-fuel mixture.

To calculate the air-fuel mixture temperature Ta5, the mist particle diameter distribution, or in other words the mass ratio, of the fuel injected by the fuel injector 21 must be clarified. The vaporization ratio MxOA of the fuel must also be calculated.

The calculation process for calculating the fuel vaporization ratio MX0A will be described below.

Figure 6:
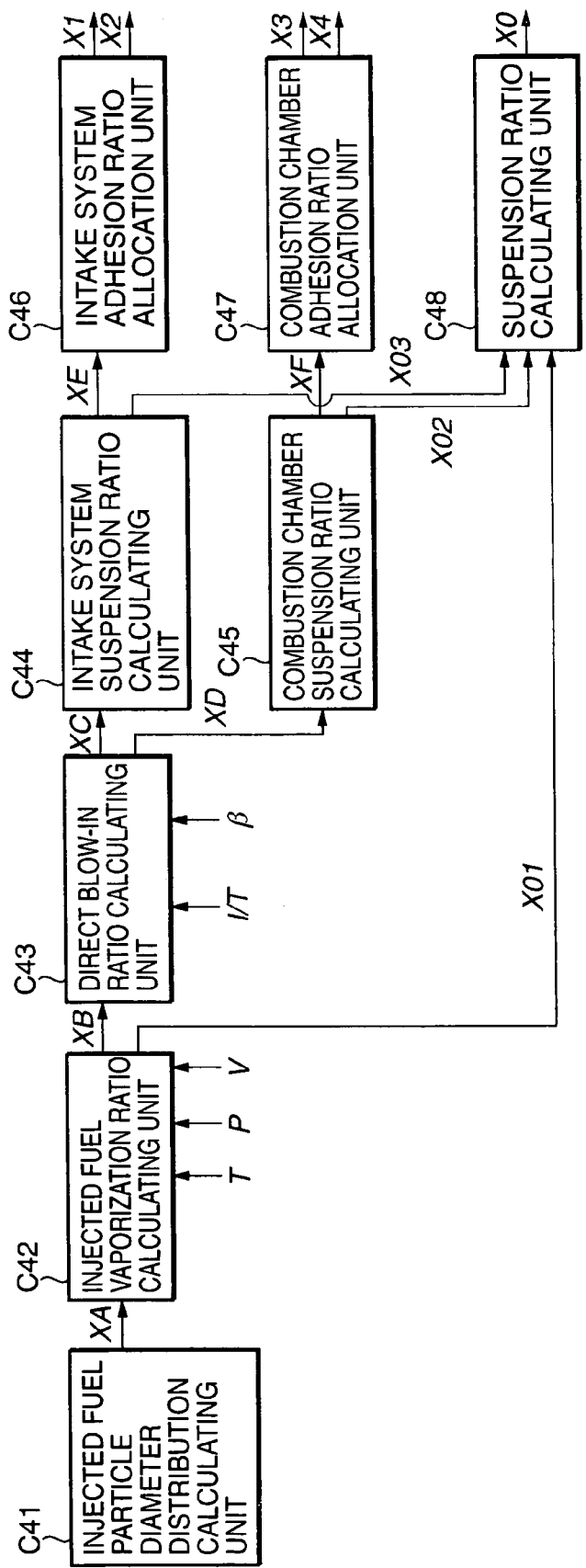
FIG. 6 is a block diagram illustrating a function provided in the controller for analyzing fuel behavior.

Referring to FIG. 6, in order to perform behavior analysis of the fuel injected by the fuel injector 21 that is required for the calculation of MX0A, the controller 31 comprises an injected fuel particle diameter distribution calculating unit C41, an injected fuel vaporization ratio calculating unit C42, a direct blow-in ratio calculating unit C43, an intake system suspension ratio calculating unit C44, a combustion chamber suspension ratio calculating unit C45, an intake system adhesion ratio allocation unit C46, a combustion chamber adhesion ratio allocation unit C47 and a suspension ratio calculating unit C48. These units C41–C48 represent the functions of the controller 31 as virtual units, and do not exist physically.

First, a brief description of the functions of the units C41–C48 will be given, followed by a detailed description of the methods of calculating the values calculated by these units.

The injected fuel particle diameter distribution calculating unit C41 calculates the particle diameter distribution of the injected fuel. The particle diameter distribution of the injected fuel represents the mass ratio of the injected fuel in each particle diameter region in terms of a matrix. A map of this particle diameter distribution is pre-stored in the ROM of the controller 31. The calculation of the injected fuel particle diameter performed by the injected fuel particle diameter distribution calculating unit C41 therefore implies that a mass ratio matrix for each injected fuel particle diameter is read out from the ROM of the controller 31.

The injected fuel vaporization ratio calculating unit C42 calculates the vaporization ratio of the injected fuel in each particle diameter region from a temperature T, pressure P and flow velocity V of an intake port 4. A ratio X01 (%) of vaporized fuel in the injected fuel is then computed by integrating the vaporization ratio for all particle diameter regions. All the vaporized fuel flows into the combustion chamber 5. On the other hand, the ratio of fuel which is not vaporized is XB= 100–X01. In other words, a fuel amount XB (%) in the injected fuel is not vaporized. The injected fuel vaporization ratio calculating unit C42 outputs the distribution ratio X01 of the vaporized fuel to the suspension ratio calculating unit C48 and outputs the distribution ratio XB of the non-vaporized fuel to the direct blow-in ratio calculating unit C43.

Figure 12:
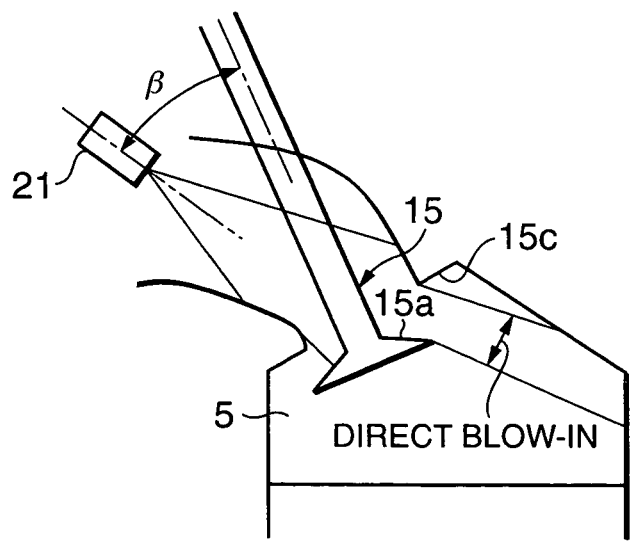
FIG. 12 is a schematic longitudinal sectional view of the engine, illustrating direct blow-in of the injected fuel into a combustion chamber.

The direct blow-in ratio calculating unit C43 calculates a ratio XD (%) of the injected fuel which is directly blown into the combustion chamber 5 without vaporizing and without striking the intake valve 15 or intake air port 4 from a fuel injection timing I/T, and an angle β subtended by the fuel injector 21 and intake valve 15 shown in FIG. 12. A ratio XC (%) of injected fuel remaining in the intake air port 4 is also calculated by the calculation equation XC=XB–XD. The direct blow-in ratio calculating unit C43 outputs the distribution ratio XC to the intake system suspension ratio calculating unit C44, and outputs the distribution ratio XD of direct blow-in fuel to the combustion chamber suspension ratio calculating unit C45.

The intake system suspension ratio calculating unit C44 calculates a ratio X02 (%) of the fuel remaining in the intake port 4, which is present as a vapor or mist. In the following description, the term suspended fuel comprises vaporized fuel and fuel which is suspended in the form of a mist. The intake system suspension ratio calculating unit C44 also calculates a ratio XE (%) of fuel adhering to the intake port 4 and intake valve 15 by the calculation equation XE= XC–X02.

Hereafter, the fuel adhering to the intake port 4 and the fuel adhering to the intake valve 15 will be referred to generally as intake system adhesion fuel. The intake system suspension ratio calculating unit C44 outputs the distribution ratio X02 (%) of the suspended fuel to the suspension ratio calculating unit C48, and outputs the distribution ratio XE (%) of the intake system adhesion fuel to the intake system adhesion ratio allocating unit C46.

The combustion chamber suspension ratio calculating unit C45 calculates a ratio X03 (%) of suspended fuel in the combustion chamber 5, in the non-vaporized fuel directly blown into the combustion chamber 5. It also calculates a ratio XF (%) of fuel adhering to the combustion chamber low temperature wall surface and combustion chamber high temperature wall surface by the calculation equation XF=XD−X03. Hereafter, the fuel adhering to the combustion chamber low temperature wall surface and the fuel adhering to the combustion chamber high temperature wall surface will be referred to generally as combustion chamber adhesion fuel. The combustion chamber suspension ratio calculating unit C45 outputs the distribution ratio X03 of suspended fuel to the suspension ratio calculating unit C48, and outputs the distribution ratio XF of combustion chamber adhesion fuel to a combustion chamber adhesion ratio allocating unit C47.

The intake system adhesion ratio allocating unit C46 allocates the distribution ratio XE of intake system adhesion fuel as a ratio X1 (%) of fuel adhering to the intake valve 15 and a ratio X2 (%) of fuel adhering to the intake port 4.

The combustion chamber adhesion ratio allocating unit C47 allocates the distribution ratio XF of combustion chamber adhesion fuel to a ratio X3 (%) of fuel adhering to the combustion chamber high temperature wall surface and a ratio X4 (%) of fuel adhering to the combustion chamber low temperature wall surface.

The suspension ratio calculating unit C48 totals the distribution ratios X01, X02, X03 of suspended fuel at each site, and calculates a ratio X0 of suspended fuel in the combustion chamber 5.

Next, the method of calculating these distribution ratios will be described.

In order to calculate these distribution ratios, this invention sets a total injected fuel distribution model, a vaporized fuel distribution model, a direct blow-in fuel distribution model, a suspended fuel distribution model, an intake system adhesion fuel distribution model, a combustion chamber adhesion fuel distribution model, and an adhesion fuel vaporization and discharge model.

These models will now be described.

Total Distribution Model of Injected Fuel

Referring to FIGS. 7A–7F, to estimate the distribution ratios X0–X4, the distribution process from the fuel injection timing is represented by six models in time sequence, i.e., injection vaporization, direct blow-in, intake system adhesion and suspension, intake system adhesion, combustion chamber adhesion and suspension, and combustion chamber adhesion.

(1) Injection Vaporization Model

The fuel injected by the fuel injector 21 is a fuel mist of different particle diameters.

Figure 7A:
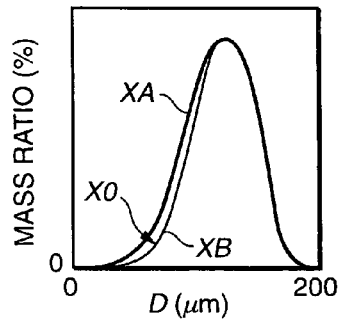
FIGS. 7A–7F are diagrams illustrating the behavior of injected fuel.

According to studies carried out by the inventors, as shown in FIG. 7A, taking the particle diameter D ($\mu$m) on the abscissa and the mass ratio (%) on the ordinate, the particle diameter distribution of injected fuel having the distribution ratio XA has a profile close to that of a normal distribution shown by the thick line in the diagram. The area enclosed by this thick line corresponds to the total injection amount. Part of the injected fuel immediately vaporizes. The smaller the particle diameter is, the easier it is to vaporize the particle, and hence, as shown by the thin line in the diagram, the vaporized fuel particle distribution having the distribution ratio XB has a profile wherein small particle diameters have been eliminated from the injected fuel. The area enclosed by the thick line and thin line corresponds to vaporized fuel having the distribution ratio X01.

(2) Direct Blow-in Model

Figure 7B:
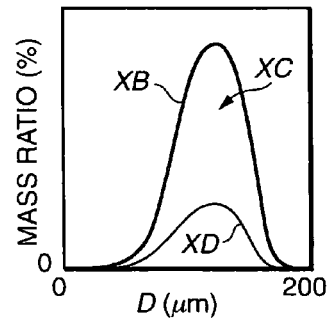

In FIG. 7B, the thick line corresponds to that part of the injected fuel which is not vaporized having the distribution ratio XB, i.e. the thin line in FIG. 7A. Therein, a distribution ratio XD of fuel which is directly blown into the combustion chamber 5 is shown by the thin line. The area enclosed by the thick line and thin line corresponds to fuel having the distribution ratio XC which remains in the intake port 4.

(3) Intake System Adhesion and Suspension Model

Figure 7C:
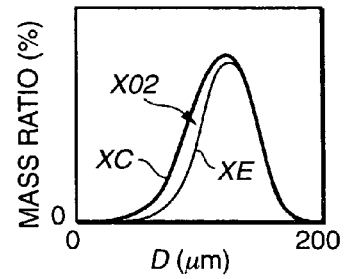

The part of the fuel having the distribution ratio XC which remains in the intake port 4 is suspended as a mist or vapor, and the remainder adheres to the side walls of the intake port 4 and the intake valve 15. The smaller the particle diameter is, the easier it is for the particle to become suspended. The thick line in FIG. 7C represents the particle distribution of fuel with the distribution ratio XC remaining in the intake port 4. The intake system adhesion fuel having the distribution ratio XE, as shown by the thin line in the figure, has a profile wherein small particle diameters have been eliminated from the curve for fuel having the distribution ratio XC. The area enclosed by the thick line and thin line corresponds to the suspended fuel in the distribution ratio X02.

(4) Combustion Chamber Adhering and Suspended Fuel

Part of the fuel which is directly blown into the combustion chamber 5 is suspended as a mist or vapor, and the remainder adheres to the combustion chamber high temperature wall surface and combustion chamber low temperature wall surface. The smaller the particle diameter is, the easier it is for the particle to become suspended. The thick line in FIG. 7E shows the fuel with the distribution ratio XD which is directly blown into the combustion chamber 5. The combustion chamber adhesion fuel with the distribution ratio XF, as shown by the thin line in the figure, has a profile wherein small particle diameters are eliminated from the curve of the fuel having the distribution ratio XD. The area enclosed by the thick line and the thin line corresponds to the suspended fuel having the distribution ratio X03.

(5) Intake System Adhesion Fuel

Figure 7D:
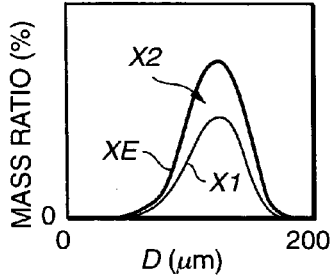
Figure 7E:
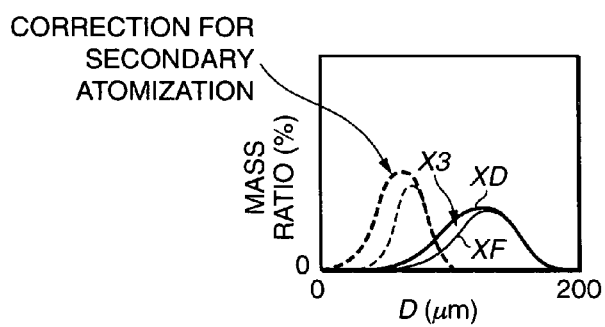

In FIG. 7D, the thick line corresponds to the intake system adhesion fuel XE, i.e. the thin line in FIG. 7C. Therein, fuel having the distribution ratio X1 adhering to the intake valve 15 is shown by the thin line. The area enclosed by the thick line and thin line corresponds to fuel having the distribution ratio X2 adhering to the intake port 4.

(6) Combustion Chamber Adhesion Model

Figure 7F:
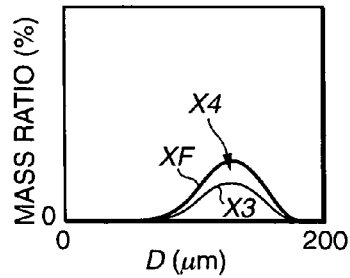

In FIG. 7F, the thick line corresponds to the combustion chamber adhesion fuel having the distribution ratio XF, i.e. the thin line in FIG. 7D. Therein, fuel having the distribution ratio X3 adhering to the combustion chamber high temperature wall surface is shown by the thin line. The area enclosed by the thick line and thin line corresponds to fuel having the distribution ratio X4 adhering to the combustion chamber low temperature wall surface.

In FIGS. 7A–7F, all of the fuel curves express the particle diameter distribution as a mass percentage of the injected fuel, and their respective surface areas express ratios relative to the injected fuel, i.e. distribution ratios. The area enclosed by the thick line and the horizontal axis in FIG. 7A is the distribution ratio XA in the total fuel amount injected, and corresponds to 100%.

Next, the method of calculating the distribution ratios XA, XB, XC, XD, XE, XF and X01–X03 will be described.

Figure 8A:
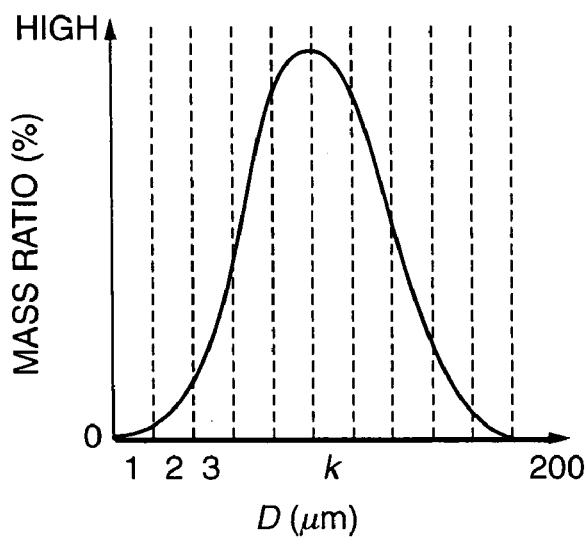
FIGS. 8A and 8B are diagrams showing the relationship between a particle diameter and a mass ratio of the injected fuel.
Figure 8B:
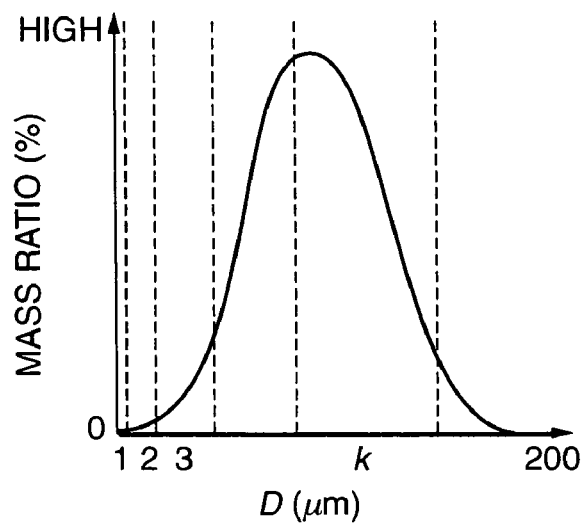

Vaporized Fuel Distribution Model (1) Injected Fuel Particle Diameter Distribution For the injected fuel particle diameter distribution, the results shown in FIG. 8A or FIG. 8B, measured in advance for the fuel injector 21, are used.

In FIG. 8A, the particle diameter is divided into equal regions. In FIG. 8B, on the other hand, in the area where the particle diameter is small, the region is divided into smaller regions, and the region unit is increased as the particle diameter increases. Specifically, the width of the region is set to be expressed by $2^n$ (n is a positive integer). Any method may be applied to the particle diameter distribution of the injected fuel XA. The calculation precision rises as the number of regions increases, but since the capacity of the memory (ROM, RAM) required by the controller 31 and the calculation load also increase, the region is preferably set according to the performance of the microcomputer forming the controller 31.

The simplest method is to determine the vaporization ratio and non-vaporization ratio of the injected fuel based on the average particle diameter of the injected fuel in one region. However, the particle diameter distribution may differ even for the same average particle diameter, so the particle diameter distribution area must be divided into plural regions so as to reflect differences in particle diameter distribution in the injected fuel vaporization ratio and non-vaporization ratio.

(2) Distribution Ratio X01 of Vaporized Fuel Immediately after Injection

Figure 9:
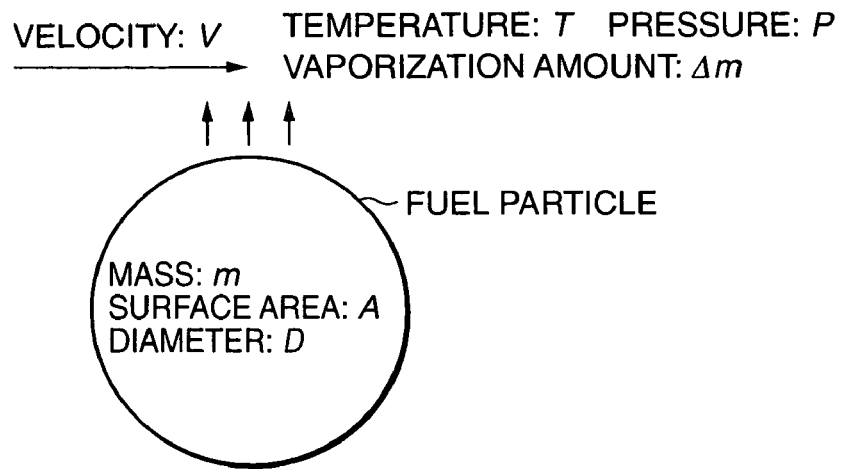
FIG. 9 is a diagram illustrating a vaporization ratio of the injected fuel.

Referring to FIG. 9, the ratio X01 of vaporized fuel immediately after injection is expressed by the following equations (17) and (18), taking the injected fuel particle mass as m, surface area as A1, diameter as D, vaporization amount as $\Delta m$, gas flow velocity of the intake port 4 as V, temperature of the intake port 4 as T, and pressure of the intake port 4 as P:

$$X01 = \Delta m/m \quad (17)$$

$$\Delta m = f(V,T,P) \cdot A1 \cdot t \quad (18)$$

f (V,T,P) in equation (18) shows the vaporization amount from the fuel particles per unit surface area and unit time, and in the following description is referred to generally as the vaporization characteristic. The vaporization characteristic f (V,T,P) is a function of the gas flow velocity V of the intake port, intake port temperature T and intake port pressure P. t in equation (18) represents unit time. The pressure P of the intake port 4 is lower than the atmospheric pressure Pa due to the intake negative pressure of the internal combustion engine 1, and is a negative pressure based on the atmospheric pressure Pa. The surface area as A1 and mass m of the fuel particle are represented by the following equation (19), (20):

$$A1 = D^2 \cdot K1\# \quad (19)$$

$$m = D^3 \cdot K2\# \quad (20)$$

where

K1#, K2#=constants.

Substituting equations (19) and (20) in equations (17) and (18), and ing $\Delta m$, the following equation (21) is obtained:

$$X01 = \Sigma \frac{XAk \cdot f(V, T, P) \cdot A \cdot t \cdot KA\#}{Dk} \quad (21)$$

(21)

where

XAk=mass ratio of kth particle diameter region from minimum particle diameter region, Dk=average particle diameter of kth particle diameter region from minimum particle diameter region, and KA#=effective usage rate of gas flow velocity V, which varies slightly according to particle diameter region, but may be considered practically as a constant less than unity.

$\Sigma$ in equation (21) represents all regions in the particle diameter ion, i.e. the integral from k=1 to the maximum number of regions.

Figure 10:
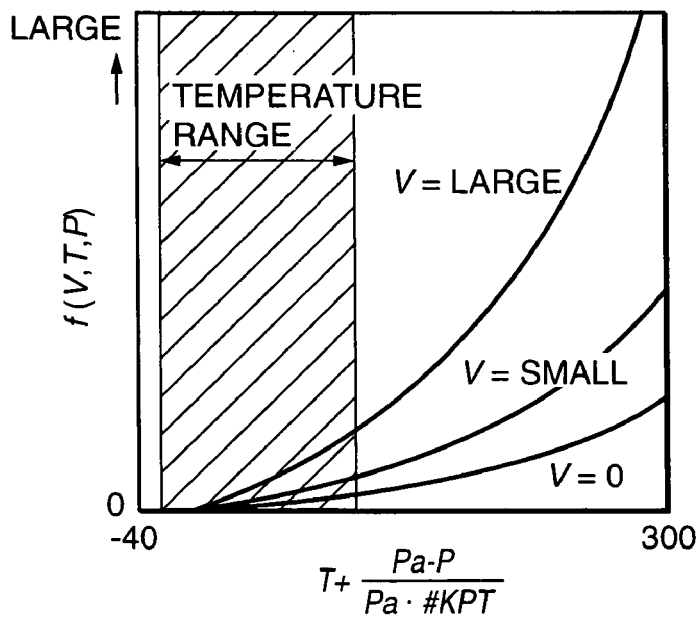
FIG. 10 is a diagram illustrating the vaporization characteristic f (V,T,P) of the injected fuel.

The vaporization characteristic f (V,T,P) is found by the controller 31 by looking up a map having the characteristics shown in FIG. 10 which is pre-stored in the internal ROM, from the temperature T and gas flow velocity V of the intake port 4. As shown in the figure, the vaporization characteristic f (V,T,P) takes a larger value as the temperature T and gas flow velocity V of the intake port 4 increase.

In the figure, the vaporization characteristic f (V,T,P) is expressed within a range from minus 40 degrees to plus 300 degrees, but vaporization of the injected fuel actually takes place within a region marked as the temperature range in the figure.

In this map, instead of the temperature T, a value obtained by adding a pressure correction to the temperature T, i.e.

$$T + \frac{Pa - P}{Pa\#KPT},$$

is used on the abscissa, Pa is the atmospheric pressure, and #KPT is a constant.

Even if the temperature T of the intake port 4 is identical, if the pressure P is less than the atmospheric pressure Pa as when the internal combustion engine 1 is on low load, fuel vaporizes more easily than when the pressure P is near the atmospheric pressure Pa, as when the engine is on high load. In order to reflect this characteristic in the temperature T, the above pressure-corrected value is used instead of the temperature T for the determination of the vaporization characteristic f (V,T,P).

Among the parameters of the vaporization characteristic f (V,T,P), the gas flow velocity V is a value related to both the flow velocity of the air aspirated into the combustion chamber 5 and the flow velocity of the fuel injected from the fuel injector 21. The latter depends on the spray penetration of the injected fuel. Therefore, in the actual calculation of the ratio X01 of the vaporized fuel immediately after injection, the following equation (22) is used instead of the equation (21):

$$X01 = \Sigma \frac{XAk \cdot f(Vx, T, P) \cdot A \cdot t1 \cdot KA\#}{Dk} + \Sigma \frac{XAk \cdot f(Vy, T, P) \cdot A \cdot t2 \cdot KA\#}{Dk} \quad (22)$$

where

Vx=penetration rate of injected fuel, t1=penetration time required by injected fuel, Vy=intake air flow velocity, and t2=intake air exposure time of injected fuel.

The injected fuel penetration rate Vx and required penetration time $t_1$ are values uniquely determined by a fuel pressure Pf acting on the fuel injector 21. If the internal combustion engine 1 is an engine wherein the fuel pressure Pf is varied, the injected fuel penetration rate Vx and required penetration time t1 are set using the fuel pressure Pf as a parameter.

On the other hand, air intake into the combustion chamber 5 is performed intermittently. Therefore, the intake air flow velocity Vy is directly proportional to the engine rotation speed Ne, and is found by the following equation (23):

$$Vy = Ne \cdot \#KV \quad (23)$$

where $\#KV$ = flow velocity index.

The flow velocity index $\#KV$ is determined according to a value obtained by dividing the flow path cross-sectional area of the intake port 4 by the cylinder volume. The flow path cross-sectional area of the intake port 4 and the cylinder volume are known beforehand from the specification of the internal combustion engine 1, and $\#KV$ is also known beforehand as a constant value. However, $\#KV$ also includes a coefficient for unit adjustment.

Figure 11:
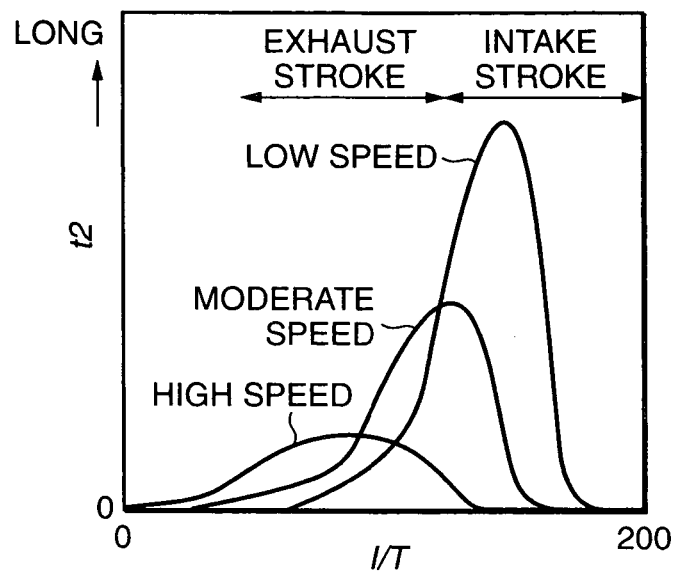
FIG. 11 is a diagram illustrating the characteristic of an intake air exposure time t2 of the injected fuel.

The intake air exposure time $t_2$ of the injected fuel is affected by the fuel injection timing I/T of the fuel injector 21 and the engine rotation speed Ne. The controller 31 calculates the intake air exposure time $t_2$ of the injected fuel by looking up a map having the characteristics shown in FIG. 11, which is pre-stored in the ROM, from the engine rotation speed Ne and fuel injection timing I/T.

Among the parameters in the vaporization characteristic f (V,T,P), the intake air temperature detected by the intake air temperature sensor 44 is used for the temperature T. If the intake air in the combustion chamber 5 contains recirculated exhaust gas due to external exhaust gas recirculation or internal exhaust gas recirculation, the temperature of the recirculated exhaust gas must be taken into account. In this case, the temperature T is found by taking the simple average or weighted average of the cooling water temperature Tw detected by the cooling water temperature sensor 145 and the intake air temperature. The vaporization heat of the injected fuel is not taken into account, and is covered by making an adjustment when the map is drawn up.

Among the parameters in the vaporization characteristic f (V,T,P), the intake air pressure in the intake collector 2 detected by the pressure sensor 46 is used as the pressure P.

(3) Distribution Ratio XB of Non-Vaporized Fuel

The distribution ratio XB of non-vaporized fuel is given by the following equation (24):

$$XB = XA - X01 \quad (24)$$

Distribution Model for Fuel Which is Directly Blown in (1) Distribution Ratio XD of Fuel Which is Directly Blown into the Combustion Chamber 5

Referring to FIG. 12, when the fuel injector 21 performs an intake stroke injection, part of the fuel is directly blown into the combustion chamber 5 from a gap between the intake valve 15 which has lifted and a valve seat 15C. If the ratio of non-vaporized fuel in the fuel which is directly blown into the combustion chamber 5 is a direct blow-in rate KXD, the distribution ratio of fuel directly blown into the combustion chamber 5 is given by the following equation (25):

$$XD = XB \cdot KXD \quad (25)$$

The direct blow-in rate KXD differs depending on the injection timing I/T and injection direction. The injection direction is expressed by an enclosed angle β subtended by the center axis of the fuel injector 21 and the center axis of the intake valve 15 in FIG. 12.

Figure 13:
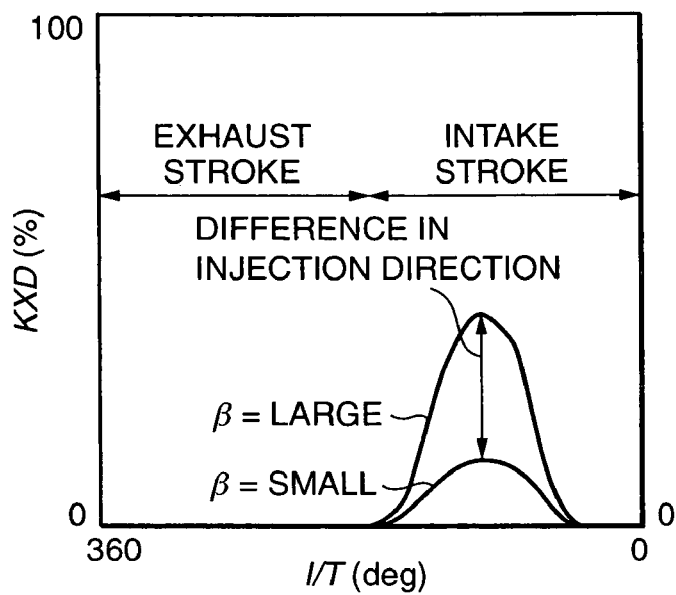
FIG. 13 is a diagram illustrating the relationship between an injection timing and a subtended angle β by an intake valve and a fuel injector.

The controller 31 calculates the direct blow-in rate KXD from the fuel injection timing I/T and enclosing angle β by looking up a map having the characteristics shown in FIG. 13 which is pre-stored in the ROM. This map is set based on experiment.

If the internal combustion engine 1 comprises an intake valve operating angle variation mechanism, the lift and the profile of the intake valve 15 have an effect on the direct blow-in rate KXD. In this case, the direct blow-in rate KXD is calculated by the following equation (26):

$$KXD = \frac{KXD0 \cdot H}{H0} \quad (26)$$

where

H = maximum lift of intake valve 15,

H0 = basic maximum lift, and

KXD0 = direct blow-in rate for basic maximum lift.

The basic maximum lift H0 is the maximum lift of the intake valve 15 when the intake valve operating angle variation mechanism is not operated. When the intake valve operating angle variation mechanism is operated, the maximum lift of the intake valve 15 decreases from H0 to H, and the direct blow-in rate KXD decreases correspondingly. Equation (26) decreases the direct blow-in rate KXD in direct proportion to the decrease of the maximum lift.

(2) Distribution Ratio XC of Fuel Remaining in the Intake Port 4

The distribution ratio XC of fuel remaining in the intake port 4 is calculated by the following equation (27):

$$XC = XB - XD \quad (27)$$

Distribution Model of Suspended Fuel (1) Distribution Ratio X02 of Fuel Suspended in Intake Port 4

Figure 14:
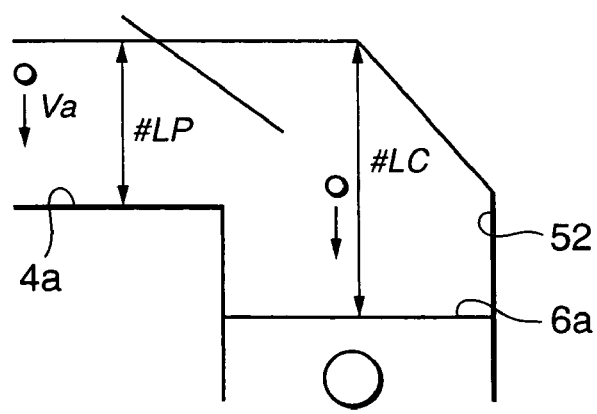
FIG. 14 is a diagram illustrating the suspension condition of the injected fuel in an intake port and the combustion chamber.

Referring to FIG. 14, a natural descent model is envisaged wherein the fuel in the intake port 4 is uniformly distributed, and mist falls under gravity. It is assumed that fuel which descends and reaches the intake port side wall 4a adheres to the intake port side wall 4a, and fuel which does not adhere to the intake port side wall 4a is suspended.

Figure 15:
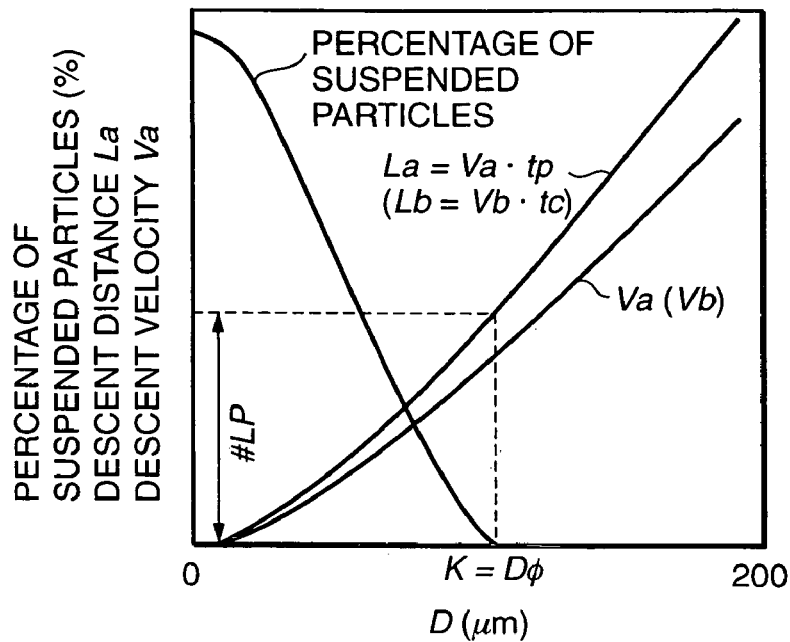
FIG. 15 is a diagram showing the relationship between the descent velocity and the proportion of suspended particles, according to particle diameter, of the injected fuel.

It is assumed that a descent velocity Va of fuel particles, as shown in FIG. 15, increases as the particle diameter D of the fuel increases. A descent distance La is calculated by multiplying the descent velocity Va by a suspension time ta.

If the height of the intake port 4 is $\#LP$ as shown in FIG. 14, then as shown in FIG. 15, all fuel particles for which the descent distance La exceeds $\#LP$ adhere to the intake port side wall 4a. The ratio of suspended particles decreases as the particle diameter D increases, and is zero at a particle diameter region k= D0 at which the descent distance La exceeds $\#LP$. Therefore, the sum of suspension ratios for each particle diameter is the distribution ratio X02 of fuel suspended in the intake port 4. This calculation is performed by the following equations (28)–(30):

$$X02 = \sum \left(1 - \frac{Lak}{\#LP}\right) \cdot XCk \quad (28)$$

where

Lak = arrival distance of fuel in particle diameter region k, and

XCk=mass ratio of kth particle diameter region from minimum particle diameter region for intake port residual fuel having distribution ratio XC.

$$Lak = Vak\, tp \qquad (29)$$

where
- Vak=descent velocity of fuel in particle diameter region k, and
- tp=suspension time of fuel particles.

The suspension time tp of fuel particles is taken as the time from the fuel injection timing I/T to the start of the compression stroke.

Substituting equation (29) into equation (28), equation (30) is obtained:

$$X02 = \sum \left(1 - \frac{Vak \cdot tp}{\# LP}\right) \cdot XCk \qquad (30)$$

The controller 31 calculates the distribution ratio X02 of fuel suspended in the intake port 4 by performing the integration of equation (30) from the particle diameter region k=1 to D0, by looking up a map of the descent velocity Vak of fuel for each particle diameter region with the particle diameter D as a parameter, this map, which is pre-stored in the ROM, having the characteristics shown in FIG. 15. For the suspension time tp of the fuel particles, the time from the fuel injection timing I/T to the start of the compression stroke is measured using the timer function of the controller 31. The mass ratio XBk is calculated by looking up a map of particle diameter distribution of fuel remaining in the intake port with the distribution ratio XC, this map, which is pre-stored in the ROM of the controller 31, having the characteristics shown by the thick line in FIG. 7C.

(2) Distribution Ratio X03 of Fuel Suspended in the Combustion Chamber 5

The concept is identical to that for the distribution ratio X02 of fuel suspended in the intake port 4. Specifically, it is assumed that fuel is uniformly distributed throughout the combustion chamber 5, and descends under gravity. Fuel which has descended to a crown 6a of a piston 6 is considered as fuel adhering to the combustion chamber high temperature wall surface.

A descent velocity Vb of fuel particles is read from a map having the characteristics shown in FIG. 15 with the particle diameter D as a parameter. The descent distance Lb of fuel particles is calculated by multiplying the descent velocity Vb by a suspension time tc.

If the height of the combustion chamber 5 is #LC as shown in FIG. 14, all the fuel particles for which the descent distance Lb exceeds #L C adhere to the crown 6a. The ratio of suspended particles decreases as the particle diameter D increases, and is zero at the particle diameter region k=D1 for which the descent distance Lb exceeds #LC. Therefore, the sum of suspension ratios for each particle diameter is the distribution ratio X03 of fuel suspended in the intake port 4. This calculation is performed by the following equations (31)–(33):

$$X03 = \sum \left(1 - \frac{Lbk}{\# LC}\right) \cdot XDk \qquad (31)$$

where
- Lbk=arrival distance of fuel in particle diameter region k, and

XDk=mass ratio of kth particle diameter region from minimum particle diameter region for fuel having distribution ratio XD which is directly blown into the combustion chamber 5.

$$Lbk = Vbk\, tc \qquad (32)$$

where
- Vbk=descent velocity of fuel in particle diameter region k, and
- tc=suspension time of fuel particles.

The suspension time tc of fuel particles is taken as the time from the fuel injection timing I/T to the start of the compression stroke.

Substituting equation (32) into equation (32), equation (33) is obtained.

$$X03 = \sum \left(1 - \frac{Vbk \cdot tc}{\# LC}\right) \cdot XDk \qquad (33)$$

The controller 31 calculates the distribution ratio X03 of fuel suspended in the combustion chamber 5 by performing the integration of equation (33) from the particle diameter region k=1 to D1, by looking up a map of the descent velocity Vbk of fuel for each particle diameter region with the particle diameter D as a parameter, this map, which is pre-stored in the ROM, having the characteristics shown in FIG. 15. For the suspension time tc of the fuel particles, the time from the fuel injection timing I/T to the end of the compression stroke is measured using the timer function of the controller 31. The mass ratio XDk is calculated by looking up a map of particle diameter distribution of fuel which is directly blown into the combustion chamber 5 with the distribution ratio XD, this map, which is pre-stored in the ROM of the controller 31, having the characteristics shown by the thick line in FIG. 7E.

(3) Distribution Ratio XE of Intake System Adhesion Fuel and Distribution Ratio XF of Combustion Chamber Adhesion Fuel The distribution ratio XE of intake system adhesion fuel is calculated by the following equation (34) from the distribution ratio X02 of suspended fuel in the intake port 5:

$$XE = XC - X02 \qquad (34)$$

The distribution ratio XF of combustion chamber adhesion fuel is calculated by the following equation (35) from the distribution ratio X03 of suspended fuel in the combustion chamber 5:

$$XF = XD - X03 \qquad (35)$$

If the internal combustion engine 1 is provided with an intake valve operating angle variation mechanism, a secondary atomization of fuel particles directly blown into the combustion chamber 5 takes place, and therefore, the distribution ratio XD of fuel directly blown into the combustion chamber 5 and the distribution ratio X03 of suspended fuel in the combustion chamber 5 are corrected as follows. The secondary atomization is said to be an atomization of fuel particles which occurs when the intake valve operating angle variation mechanism operates, the maximum lift of the intake valve 15 decreases, and the velocity of air flowing in the gap between the intake valve 15 and valve seat 15 increases.

Referring to FIG. 7E, the secondary atomization makes the particle distribution in the distribution ratio XD of fuel directly blown into the combustion chamber 5 and the distribution ratio X03 of fuel suspended in the combustion chamber 5 vary in the direction of smaller particle diameter, as shown by the thick broken line and thin broken line in the figure. Therefore, if this invention is applied to an internal combustion engine provided with an intake valve operating angle variation mechanism, the distribution ratio XD is calculated by equation (29) using the direct blow-in rate KXD calculated by equation (26) as described above, and the map of particle diameter distribution used in the calculation of the mass ratio XDk, which is used for the calculation of the distribution ratio X03, must be corrected as shown by the thick broken line of FIG. 7E. Practically, when secondary atomization is performed, a particle diameter used for the calculation of XDk may be decreased to about one half of the particle diameter used for the calculation of XDk when secondary atomization is not performed.

Intake System Adhesion Fuel Distribution Model (1) Distribution Ratio X1 of Fuel Adhering to Intake Valve 15, and Distribution Ratio X2 of Fuel Adhering to Intake Port 4

Figure 16:
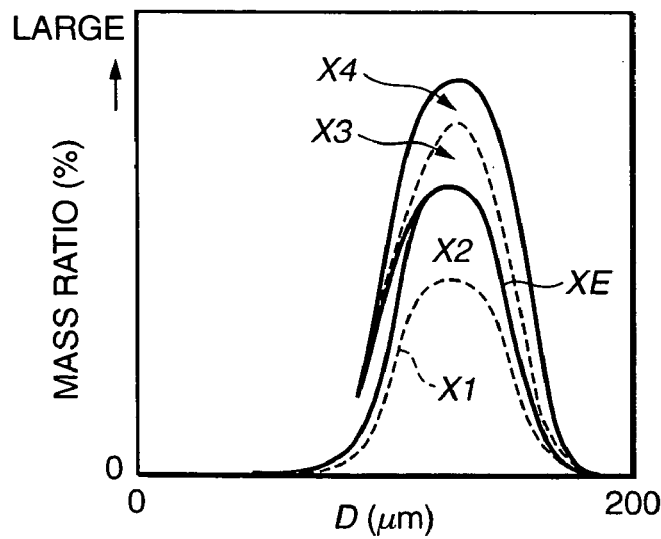
FIG. 16 is a diagram showing the particle diameter distribution of the injected fuel.

Referring to FIG. 16, the distribution ratio XE of intake system adhesion fuel is represented by the lower solid thick line. Therein, the distribution ratio X1 of fuel adhering to the intake valve 15 is represented by the lower broken line in the figure. The area enclosed by the two curves corresponds to the distribution ratio X2 of fuel adhering to the intake port 4.

Hence, the controller 31 divides the distribution ratio XE of intake system adhesion fuel into the distribution ratios X1, X2 by the following equations (36) and (37) using the intake valve direct adhesion rate #DVR:

$$X1 = XE\ KX1 \tag{36}$$

$$X2 = XE - X1 \tag{37}$$

where

KX1=intake valve direct adhesion coefficient.

Figure 17:
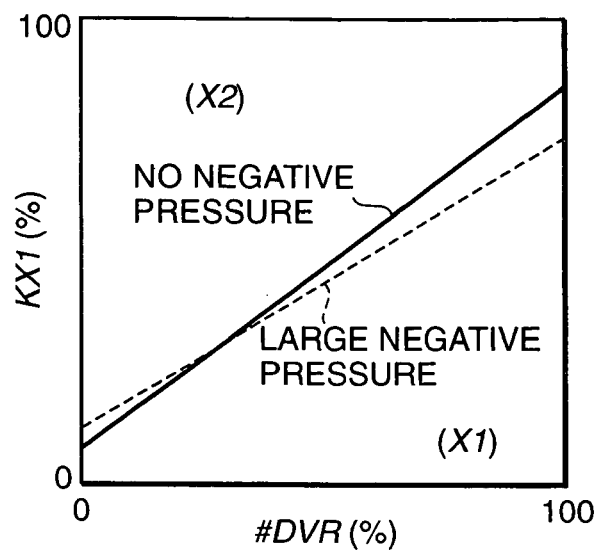
FIG. 17 is a diagram illustrating the characteristic of an intake valve direct adhesion coefficient KX1.

The controller 31 calculates the intake valve direct adhesion coefficient KX1 by looking up a map having the characteristics shown in FIG. 17 which is pre-stored in the ROM, from the intake valve direct adhesion rate #DVR and pressure P of the intake valve 4.

Referring to FIG. 17, the intake valve direct adhesion coefficient KX1 increases as the intake valve direct adhesion rate #DVR increases. For an identical intake valve direct adhesion rate #DVR, the intake valve direct adhesion coefficient KX1 takes a smaller value when the internal combustion engine 1 is on low load and the pressure P is small, than when the internal combustion engine 1 is on high load. The "high negative pressure" shown in the figure corresponds to low load when the pressure P is much less than the atmospheric pressure Pa. "No negative pressure" corresponds to high load when the pressure P is substantially equal to the atmospheric pressure Pa.

The intake valve direct adhesion rate #DVR shows the ratio of fuel which strikes the intake valve 15 in the fuel injected by the fuel injector 21. The intake valve direct adhesion rate #DVR is a value calculated geometrically beforehand according to the design of the intake port 4, intake valve 15 and fuel injector 21.

(2) Ratio X3 of Fuel Adhering to Combustion Chamber High Temperature Wall Surface, and Ratio X4 of Fuel Adhering to Combustion Chamber Low Temperature Wall Surface Referring to FIG. 16, the distribution ratio XF of combustion chamber adhesion fuel is the sum of the ratio X3 of fuel adhering to the combustion chamber high temperature wall surface, and the ratio X4 of fuel adhering to the combustion chamber low temperature wall surface.

Hence, the controller 31 divides the distribution ratio XF of combustion chamber adhesion fuel into the distribution ratios X3, X4 by the equations (38) and (39) using an allocation rate KX4:

$$X4 = X \cdot KX4 \tag{38}$$

$$X3 = XF - X4 \tag{39}$$

Figure 18:
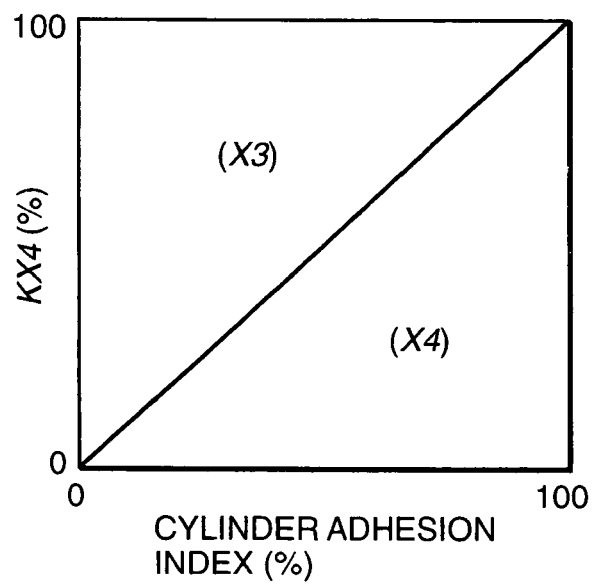
FIG. 18 is a diagram illustrating the characteristic of an allocation rate KX4.

The controller 31 calculates the allocation rate KX4 from the cylinder adhesion index by looking up a map having the characteristics shown in FIG. 18 which is pre-stored in the ROM. The cylinder adhesion index shows the ratio of fuel from among the combustion chamber adhesion fuel adhering to a cylinder wall surface 5b due to fuel which is directly blown into the combustion chamber 5 from the gap between the intake valve 15 and valve seat 15C.

For example, assuming the profile of the fuel injected by the fuel injector 21 to be conical, and taking the ratio blown into the combustion chamber 5 from the gap between the intake valve 15 and valve seat 15C as B and the ratio adhering to the cylinder wall surface 5b in the ratio B as A, A/B corresponds to the cylinder adhesion index. Referring to FIG. 18, as the cylinder adhesion index increases, the allocation rate KX4 also increases. The cylinder adhesion index can be set from a gas flow simulation model or from a wall flow recovery experiment according to site by a simple substance test.

As described above, the controller 31 calculates the distribution ratios X0, X1, X2, X3, X4 according to the overall injected fuel distribution model in FIGS. 7A–7F.

Compared to the case where the distribution ratios X0, X1, X2, X3, X4 are calculated by directly looking up a map based on running conditions such as the temperature, rotation speed and load signals, by using a physical model, the distribution ratios X0, X1, X2, X3, X4 can be precisely calculated without performing hardly any experimental adaptation for different engines. Also, the information relating to the injected fuel particle distribution is useful to improve combustion efficiency and exhaust performance.

The controller 31 calculates the fuel vaporization ratio Mx0A from the fuel injection amount Mfin of the fuel injector 21 and the fuel distribution ratio X0 suspended within the combustion chamber 5 according to the following equation (40):

$$Mx0A = Mfin \cdot X0 \tag{40}$$

Vaporization of the injected fuel deprives the air-fuel mixture of vaporization heat, causing a reduction in the air-fuel mixture temperature. This temperature reduction ΔTBvap is commensurate with the vaporization ratio MX0A, and is expressed by the following equation (41):

$$\Delta TBvap = Mx0A \cdot Kbvap\# \tag{41}$$

where

Kbvap#=a constant.

A temperature Ta5 of the air-fuel mixture is calculated from the temperature reduction ΔTBvap caused by the latent heat of vaporization of the fuel injected by the fuel injector 21, and the intake gas temperature Ta4 during transmission through the intake valve 15, and is expressed by the following equation (42):

$$Ta5 = Ta4 - \Delta TBvap \tag{42}$$

5.2 Estimation of Air-Fuel Mixture Temperature Tivc Inside Combustion Chamber 5 at Close Timing of Intake Valve 15

Next, the controller 31 calculates an air-fuel mixture temperature Ta6 after receiving heat transfer from the intake valve 15, exhaust valve 16, combustion chamber low temperature wall surface, and combustion chamber high temperature wall surface. Here, the temperature of the intake valve 15 and exhaust valve 16 refers in both cases to the temperature of the valve body rather than the valve stem.

A valve body temperature Tdl of the intake valve 15 is estimated using the following method.

A generated heat amount Q of the internal combustion engine 1 is dependent on the lower heating value $Q_L$ and the fuel injection amount, and may be calculated using the following equation (43). The fuel injection amount Mfin used in Equation (40) is employed as the fuel injection amount.

$$Q = Q_L M\mathit{fin} \tag{43}$$

Figure 23:
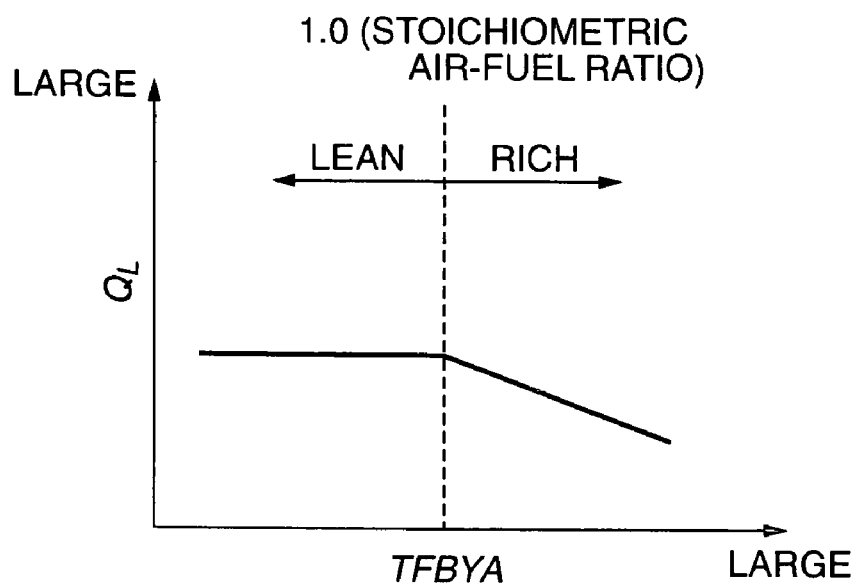
FIG. 23 is a diagram illustrating the characteristic of a map, which is stored in the controller, of a lower heating value $Q_L$.

The lower heating value $Q_L$ expresses the difference in the generated heat amount caused by differences in the combustion products of rich combustion and lean combustion. The lower heating value $Q_L$ is dependent on the target equivalence ratio TFBYA, and is determined by looking up a map having the characteristics shown in FIG. 23. The broken line in the diagram shows the target equivalence ratio TFBYA corresponding to the stoichiometric air-fuel ratio. When the target equivalence ratio TFBYA increases beyond this, or in other words when the air-fuel ratio becomes rich, the amount of unburned components such as hydrocarbon (HC) in the combustion gas increases, leading to a reduction in the lower heating value $Q_L$.

Figure 24:
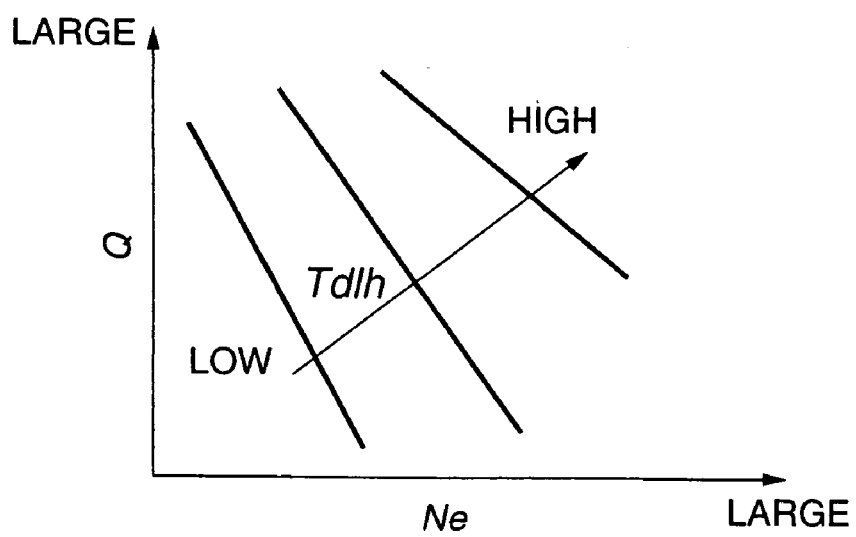
FIG. 24 is a diagram illustrating the characteristic of a map, which is stored in the controller, of an equilibrium temperature difference Tdlh.

Next, an equilibrium temperature difference Tdlh of the intake valve 15 is determined by looking up a map having the characteristics shown in FIG. 24, from the generated heat amount Q and the engine rotation speed Ne. The equilibrium temperature difference Tdlh shows the degree to which the valve body temperature of the intake valve 15 maintains equilibrium in its temperature difference with the cooling water temperature Tw during an operation of the engine 1. During a fuel cut, the equilibrium temperature difference Tdlh is zero. This is due to the fact that during a fuel cut, the engine 1 does not generate heat, and hence the valve body temperature converges toward the cooling water temperature Tw.

The equilibrium temperature difference Tdlh increases in value as the engine rotation speed Ne increases, and also as the generated heat amount Q increases.

By subjecting the equilibrium temperature difference Tdlh, determined as described above, to primary delay processing using the following equation (44), a temperature increase amount Vtdl in the valve body of the intake valve 15 from the water temperature Tw is calculated.

$$Vtdl = A \cdot (Tdlh - Tdlh_{n-1}) + Tdlh_{n-1} \tag{44}$$

where

A=temperature variation ratio (0<A<1), and $Tdlh_{n-1}$=previous value of the equilibrium temperature difference Tdlh.

The calculation of Equation (44) is executed in this format repeatedly at fixed time intervals.

Figure 25:
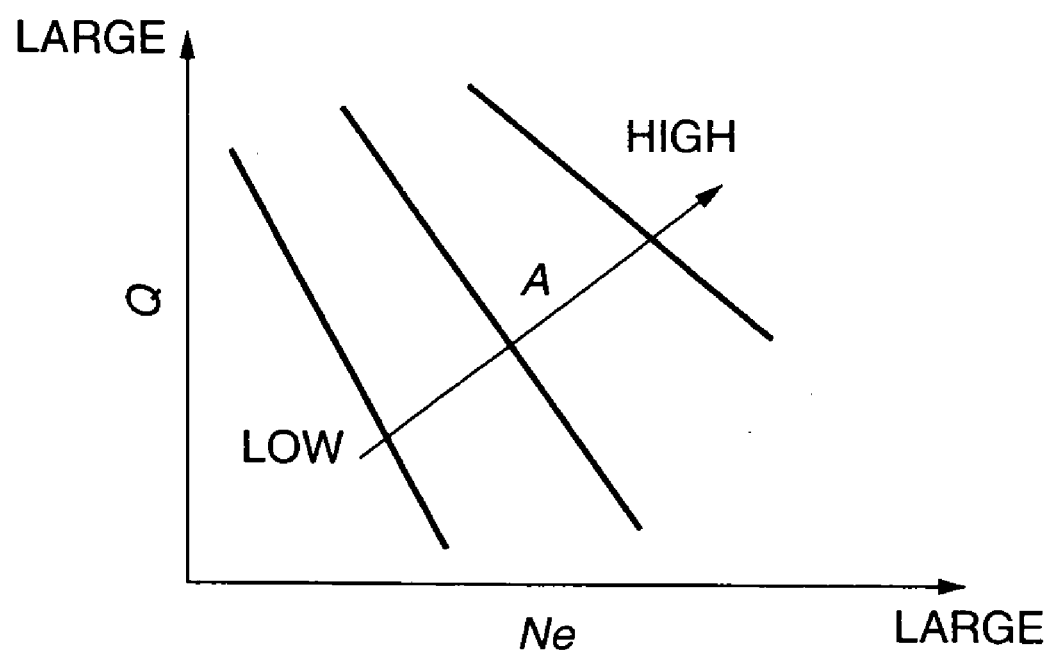
FIG. 25 is a diagram illustrating the characteristic of a map, which is stored in the controller, of a temperature variation ratio A.

The temperature variation ratio A is determined by looking up a map having the characteristics shown in FIG. 25 from the engine rotation speed Ne and generated heat amount Q. As shown in the diagram, the temperature variation ratio A increases in value as the engine rotation speed Ne increases, and also as the generated heat amount Q increases.

The valve body temperature Tdl of the intake valve 15 is therefore determined by adding the temperature increase amount Vtdl to the cooling water temperature Tw.

$$Tdl = Tw + Vtdl \tag{45}$$

A valve body temperature TdE of the exhaust valve 16 is estimated in a similar way. It should be noted however, that in this case, an equilibrium temperature difference TdEh is used in place of the equilibrium temperature difference Tdlh, and a temperature increase amount VtdE is calculated instead of the temperature increase amount Vtdl.

The cooling water temperature Tw is applied to the temperature of the combustion chamber low temperature wall surface. The exhaust gas temperature detected by the exhaust gas temperature sensor 46 is applied to the temperature of the combustion chamber high temperature wall surface.

The temperature of the intake valve 15, the temperature of the exhaust valve 16, the temperature of the combustion chamber low temperature wall surface, and the temperature of the combustion chamber high temperature wall surface, determined as described above, are denoted by $Twall_1$, $Twall_2$, $Twall_3$, and $Twall_4$ respectively. A temperature Ta6 (=Tivc) of the air-fuel mixture in the combustion chamber 5 following heat transfer reception from these wall surfaces is expressed by the following equation (46):

$$Ta6 = Ta5 + \sum_{i=1}^{3}(Twall_i - Ta5) \cdot K_i \tag{46}$$

where $K_i$=a coefficient set in each portion.

To further investigate the heat reception and discharge model between each wall surface and the intake gas in the combustion chamber 5, in a case where a gas having a mass M and a specific heat Cgas is raised in temperature by a temperature difference $\Delta t$ (K), a heat reception and discharge amount Q between each wall surface and the intake gas can be expressed on the basis of the law of heat conservation by equation (47):

$$Q = \sum_{i=1}^{3}\{h_i \cdot A_i \cdot (Twall_i - Tgas_i)\} = \frac{\Delta T \cdot Cgas \cdot M}{2} \tag{47}$$

where $h_i$=heat transfer coefficient of each portion, $A_i$=heat transfer area, and $Tgas_i$=gas temperature before heat reception.

The heat transfer coefficient $h_i$ is calculated according to the following equation (48), which is an improved Woschni equation:

$$h = 110 \cdot d^{-0.2 \cdot 0.8} \cdot T^{0.53} \cdot (C1 \cdot Cm)^{0.8} \tag{48}$$

where d=bore diameter of cylinder,

C1=a constant, and

Cm=average piston velocity.

By summarizing the dimensions and constants of each portion, and setting a coefficient $K_i$ in further consideration of the engine rotation speed Ne, which serves as a representative value of the average piston velocity Cm, Equation (47) can be rewritten as the following equation (49):

$$T_{IVC} = tgas_i + \sum_{i=1}^{3} (Twall_i - Tgas_i) \cdot K_i \qquad (49)$$

As described above, in the intake system of the engine, heat transfer at each stage up to the combustion chamber 5 is calculated in relation to the initial temperature Ta0 of the intake air, and hence the temperature of the air-fuel mixture in the combustion chamber 5 at the close timing of the intake valve 15 can be estimated with a high degree of precision.

Note that when heat transfer is calculated in a plurality of locations, the order for estimating temperature variation is arbitrary. However, in order to improve the estimation precision and reduce the number of processes, the gas temperature is preferably calculated in succession from the upstream side to the downstream side of the intake air flow. The individual calculation equations may be corrected according to whether the temperature sensor 43 which detects the intake air temperature is disposed in the vicinity of the air flow meter 32 or in the intake collector 2, whether a freezing prevention heater is provided in the throttle chamber 60, and according to differences in the layout.

Figure 26:
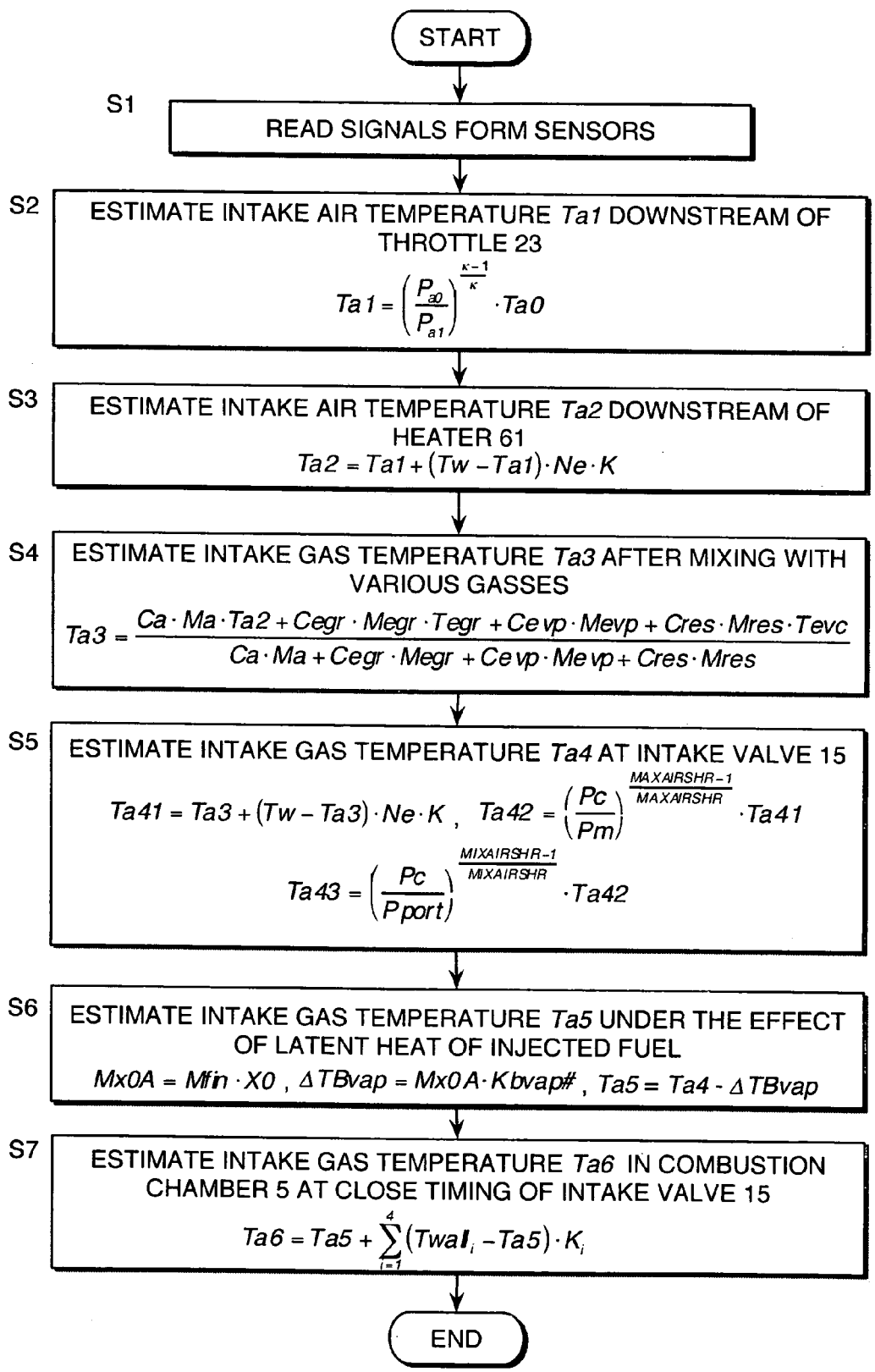
FIG. 26 is a flowchart illustrating a temperature estimation routine executed by the controller.

Finally, referring to FIG. 26, a temperature estimation routine executed by the controller 31 to estimate the temperatures described above will be described. The controller 31 executes this routine at intervals of ten milliseconds while the internal combustion engine 1 is operative.

In a step S1, the controller 31 reads the detection signals of the various sensors.

Next, in a step S2, the controller 31 estimates the intake air temperature Ta 1 downstream of the intake throttle 23.

Next, in a step S3, the controller 31 estimates the intake air temperature Ta2 downstream of the hot water heater 61.

Next, in a step S4, the controller 31 estimates the intake gas temperature Ta3 after the purge gas, internal EGR gas, and external EGR gas have been mixed into the intake air.

Next, in a step S5, the controller 31 estimates the intake gas temperature Ta4 while passing through the intake valve 15.

Next, in a step S6, the controller 31 estimates the intake gas temperature Ta5 in consideration of temperature variation caused by the latent heat of vaporization of the fuel injected by the fuel injector 21.

Finally, in a step S7, the controller 31 estimates the intake gas temperature Ta6 within the combustion chamber 5 at the close timing of the intake valve 15.

The contents of Tokugan 2003-368851, with a filing date of Oct. 29, 2003 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the above embodiment, the parameters required for control are detected using sensors, but this invention can be applied to any device which can perform the claimed control using the claimed parameters regardless of how the parameters are acquired. Further, in the above embodiment, the controller is constituted by a single microcomputer, but it may be constituted by plural microcomputers.

The embodiments of this invention in which an exclusive property or privilege is claimed are defined as follows:

What is claimed is:

1. A programmable estimation device which estimates a temperature of an intake gas that is aspirated into a combustion chamber of an internal combustion engine, programmed to:
    estimate a mass, a temperature, and a specific heat of air that is aspirated into the combustion chamber;
    estimate a mass, a temperature, and a specific heat of a gas other than air that is aspirated into the combustion chamber; and
    estimate the temperature of the intake gas that is aspirated into the combustion chamber on the basis of the mass, temperature, and specific heat of the air and the mass, temperature, and specific heat of the gas other than air.

2. The estimation device as defined in claim 1, wherein the estimation device is further programmed to calculate a sum of a product of the mass, temperature, and specific heat of the air that is aspirated into the combustion chamber and a product of the mass, temperature, and specific heat of the gas other than air that is aspirated into the combustion chamber as a first value, calculate a sum of a product of the mass and specific heat of the air that is aspirated into the combustion chamber and a product of the mass and specific heat of the gas other than air that is aspirated into the combustion chamber as a second value, and determine the temperature of the intake gas that is aspirated into the combustion chamber from a third value obtained by dividing the first value by the second value.

3. The estimation device as defined in claim 2, wherein the gas other than air that is aspirated into the combustion chamber comprises plural kinds of gases, and the estimation device is further programmed to determine the third value according to the following equation:

$$Ta3 = \frac{Ca \cdot Ma \cdot Ta + \sum_{i=1}^{n}(C_i \cdot M_i \cdot T_i)}{Ca \cdot Ma + \sum_{i=1}^{n}(C_i \cdot M_i)}$$

where
    Ta3=third value,
    Ca=specific heat of air aspirated into combustion chamber,
    Ma=mass of air aspirated into combustion chamber,
    Ta=temperature of air aspirated into combustion chamber,
    $C_i$=specific heat of each gas other than air aspirated into combustion chamber,
    $M_i$=mass of each gas other than air aspirated into combustion chamber,
    $T_i$=temperature of each gas other than air aspirated into combustion chamber, and
    n=number of gases other than air aspirated into combustion chamber.

4. The estimation device as defined in claim 1, wherein the internal combustion engine comprises a fuel tank which stores fuel for combustion, and a purge gas passage through which purge gas containing evaporated fuel in the fuel tank is mixed into the air that is aspirated into the combustion chamber, and the gas other than air that is aspirated into the combustion chamber comprises the purge gas.

5. The estimation device as defined in claim 1, wherein the internal combustion engine comprises an intake valve facing the combustion chamber, an exhaust valve facing the combustion chamber, the intake valve and exhaust valve having a valve overlap period, and an intake passage connected to the intake valve, and the gas other than air that is aspirated into the combustion chamber comprises an internally recirculated exhaust gas which flows from the combustion chamber into the intake passage through the intake valve during the valve overlap period.

6. The estimation device as defined in claim 1, wherein the internal combustion engine comprises an exhaust valve facing the combustion chamber, and an exhaust gas recirculation passage which mixes a part of an exhaust gas discharged from the exhaust valve into the air that is aspirated into the combustion chamber as an externally recirculated exhaust gas, and the gas other than air that is aspirated into the combustion chamber comprises the externally recirculated exhaust gas.

7. The estimation device as defined in claim 1, wherein the internal combustion engine comprises an intake port which supplies the combustion chamber with a gaseous mixture containing the air that is aspirated into the combustion chamber and the gas other than air that is aspirated into the combustion chamber, and a fuel injector which injects a fuel toward the flow of the gaseous mixture from the intake port, and the estimation device is further programmed to calculate a temperature reduction amount caused by a latent heat of fuel vaporization of the injected fuel, and correct the temperature of the intake gas that is aspirated into the combustion chamber on the basis of the temperature reduction amount.

8. The estimation device as defined in claim 1, wherein the combustion chamber is defined by wall surfaces having different temperatures, and the estimation device is further programmed to estimate a temperature of each wall surface, and correct the temperature of the intake gas according to the estimated temperature of each wall surface.

9. The estimation device as defined in claim 1, wherein the internal combustion engine comprises an intake passage which aspirates the air into the combustion chamber, the gas other than air that is aspirated into the combustion chamber mixing with the air that is aspirated into the combustion chamber at a point in the intake passage, and the estimation device is further programmed to estimate a temperature variation in the air inside the intake passage until the air that is aspirated into the combustion chamber mixes with the gas other than air that is aspirated into the combustion chamber, and estimate the temperature of the intake gas on the basis of the temperature variation.

10. An estimation device which estimates a temperature of an intake gas that is aspirated into a combustion chamber of an internal combustion engine, comprising:

means for estimating a mass, a temperature, and a specific heat of air that is aspirated into the combustion chamber;

means for estimating a mass, a temperature, and a specific heat of a gas other than air that is aspirated into the combustion chamber; and means for estimating the temperature of the intake gas that is aspirated into the combustion chamber on the basis of the mass, temperature, and specific heat of the air and the mass, temperature, and specific heat of the gas other than air.

11. A programmable estimation method which estimates a temperature of an intake gas that is aspirated into a combustion chamber of an internal combustion engine, comprising:

estimating a mass, a temperature, and a specific heat of air that is aspirated into the combustion chamber;

estimating a mass, a temperature, and a specific heat of a gas other than air that is aspirated into the combustion chamber; and estimating the temperature of the intake gas that is aspirated into the combustion chamber on the basis of the mass, temperature, and specific heat of the air and the mass, temperature, and specific heat of the gas than air.

* * * * *